United States Patent
Shibayama

(10) Patent No.: US 8,525,567 B2
(45) Date of Patent: Sep. 3, 2013

(54) PIPELINE CIRCUIT, SEMICONDUCTOR DEVICE, AND PIPELINE CONTROL METHOD

(75) Inventor: Atsufumi Shibayama, Tokyo (JP)

(73) Assignee: NEC Corporation, Tokyo (JP)

( * ) Notice: Subject to any disclaimer, the term of this patent is extended or adjusted under 35 U.S.C. 154(b) by 69 days.

(21) Appl. No.: 13/380,006

(22) PCT Filed: Apr. 28, 2010

(86) PCT No.: PCT/JP2010/003059
§ 371 (c)(1),
(2), (4) Date: Dec. 21, 2011

(87) PCT Pub. No.: WO2011/004532
PCT Pub. Date: Jan. 13, 2011

(65) Prior Publication Data
US 2012/0098583 A1    Apr. 26, 2012

(30) Foreign Application Priority Data
Jul. 8, 2009    (JP) .................................. 2009-161813

(51) Int. Cl.
*H03H 11/26*    (2006.01)
(52) U.S. Cl.
USPC .. 327/276; 327/299; 365/189.05; 365/189.17
(58) Field of Classification Search
None
See application file for complete search history.

(56) References Cited

U.S. PATENT DOCUMENTS

2012/0105396 A1*  5/2012  Sakamoto et al. ............ 345/204

FOREIGN PATENT DOCUMENTS

| JP | 61-250571 A | 11/1986 |
|----|-------------|---------|
| JP | 63-201725 A | 8/1988 |
| JP | 4-152432 A | 5/1992 |

OTHER PUBLICATIONS

International Search Report in PCT/JP2010/003059 dated Jun. 1, 2010 (English Translation Thereof).

* cited by examiner

*Primary Examiner* — An Luu
(74) *Attorney, Agent, or Firm* — McGinn IP Law Group, PLLC

(57) ABSTRACT

Provided is a pipeline circuit capable of flexibly controlling clock frequencies regardless of whether a pipeline operation by a flow control is stopped or not, without significantly increasing a processing latency even if a clock frequency is decreased, and in response to performance requests for a processing throughput. Among P clocks (P is a positive integer), the phases of which are delayed in the order from a first clock to a P-th clock, for example, among six clocks of P0 to P5, two successive clocks, the phases of which are delayed from each other by a predetermined phase, are allocated to a plurality of stages, for example, five-stage pipeline buffers 32*a* to 32*e*, in the order from a previous stage to a subsequent stage, and also are allocated so that one clock signal having an identical phase is shared between two adjacent pipeline buffers.

12 Claims, 9 Drawing Sheets

US 8,525,567 B2

PIPELINE CIRCUIT, SEMICONDUCTOR DEVICE, AND PIPELINE CONTROL METHOD

TECHNICAL FIELD

The present invention relates to a pipeline circuit, a semiconductor device, and a pipeline control method, and to a controller and a control method of a semiconductor device including a pipeline circuit mounted thereon. More specifically, the present invention relates to a pipeline circuit and a pipeline control method that are capable of performing pipeline processing with low latency even when a frequency of each of clock signals is reduced to reduce power. More specifically, the present invention is preferably applicable to a communication server apparatus that processes a number of events in real time as a semiconductor device.

BACKGROUND ART

A typical index for indicating processing performance of digital circuits mainly includes throughput and latency. Throughput indicates an amount that can be processed per unit time. Meanwhile, latency indicates processing time until when a predetermined processing is completed. As a related art, a circuit having a pipeline configuration is known as a circuit configuration that is capable of achieving high operation frequency and high processing throughput as in Japanese Unexamined Patent Application Publication No. 63-201725, titled "signal processing circuit" in Patent literature 1.

FIG. 13 is a block configuration diagram showing a block configuration of a pipeline circuit according to a related art, and shows a pipeline circuit including five-stage pipeline registers 110a, 110b, 110c, 110d, and 110e. In FIG. 13, a pipeline circuit 100 processes data input to a signal 113 by partial circuits 111a, 111b, 111c, and 111d in pipeline, and then outputs the data to a signal 114. Now, the signals 113 and 114 are signals each including a plurality of bits.

More specifically, the pipeline circuit 100 includes four-stage pipeline circuits in order to achieve high operational frequency and high throughput. More specifically, in the pipeline circuit 100, a circuit that performs data processing is divided into the four partial circuits 111a, 111b, 111c, and 111d by the five-stage pipeline registers 110a, 110b, 110c, 110d, and 110e. The five-stage pipeline registers 110a, 110b, 110c, 110d, and 110e all operate by clock F which is a high-speed clock signal.

Referring next to a time chart shown in FIG. 14, an operational example of the pipeline circuit 100 according to the related art shown in FIG. 13 will be described. FIG. 14 is a time chart for explaining a timing relation of data processing by the pipeline circuit 100 shown in FIG. 13.

In the time chart shown in FIG. 14, the pipeline circuit 100 receives, at timing T1, data D0 output from a previous circuit (not shown) to the signal 113 at timing T0. Specifically, at timing T1, the pipeline register 110a latches the data D0, which is then output to the partial circuit 111a. Then, the partial circuit 111a performs processing of the data D0.

Next, at timing T2, the pipeline register 110b latches the data D0 processed by the partial circuit 111a, and outputs the data D0 to the partial circuit 111b. Then, the partial circuit 111b performs the processing of the data D0.

Hereinafter, in the similar way, from timings T3 to T4, the data D0 processed by the partial circuit 111b is processed by the partial circuits 111c and 111d through the pipeline registers 110c and 110d, respectively.

Last, at timing T5, the data D0 that is processed by the partial circuit 111d is output to the signal 114 through the pipeline register 110e.

In the similar way, the pipeline circuit 100 receives, at timing T2, data D1 output from the previous circuit (not shown) to the signal 113 at timing T1. Specifically, at timing T2, the pipeline register 110a latches the data D1, which is then output to the partial circuit 111a. Then, the partial circuit 111a performs the processing of the data D1.

Next, at timing T3, the pipeline register 110b latches the data D1 processed by the partial circuit 111a, and outputs the data D1 to the partial circuit 111b. Then, the partial circuit 111b performs the processing of the data D1.

Hereinafter, in the similar way, from timings T4 to T5, the data D1 processed by the partial circuit 111b is processed by the partial circuits 111c and 111d through the pipeline registers 110c and 110d, respectively.

Last, at timing T6, the data D1 processed by the partial circuit 111d is output to the signal 114 through the pipeline register 110e.

Hereinafter, in the similar way, data D2 to D7 output from the previous circuit (not shown) to the signal 113 at timings T2 to T7 are processed by the pipeline circuit 100, and thereafter output to the signal 114 at timings T7 to T12, respectively.

In the example in a time chart shown in FIG. 14, it takes time corresponding to five cycles of clock F from when the data output from the previous circuit is processed by the pipeline circuit 100 to when the data is output to the signal 114 (e.g., at timing T0, the data D0 is input to the pipeline circuit 100 through the signal 113, and at timing T5, the data D0 is output to the signal 114 from the pipeline circuit 100). In summary, the latency of the data processing of the pipeline circuit 100 is five cycles of clock F.

On the other hand, the pipeline circuit 100 includes the four-stage pipeline circuits of partial circuits 111a, 111b, 111c, and 111d, and the data processing is achieved by a pipeline operation. Accordingly, even when the latency is five cycles, the data processing can be performed for every cycle of clock F. In summary, the throughput of the data processing of the pipeline circuit 100 is 1.0 data/cycle (indicating that one piece of data is processed for every cycle of clock F).

In the meantime, also in a circuit having a pipeline configuration, dynamic frequency scaling (DFS) that controls the clock frequency to a sufficient value according to the required throughput is effective to reduce power. However, in the related pipeline circuit, a decrease in the clock frequency causes reduction in throughput according to the decreased amount, and also an increase in latency.

With reference to a time chart shown in FIG. 15, problems of the pipeline circuit according to the related art will be described in detail. FIG. 15 is a time chart for describing a timing relation when the pipeline circuit 100 shown in FIG. 13 is operated with clocks in which the frequency of clock F is reduced by (¼). For the sake of clarification, FIG. 15 shows the clock of the frequency (¼) times as large as that of clock F as clock S. For the sake of comparison, clock F is also shown in addition to clock S.

Even when the clock frequency is reduced from clock F to clock S, the logical operation of the pipeline circuit 100 does not change, and only the timing of the operation is different from a case in which the circuit is operated with clock F.

Specifically, in FIG. 15, the pipeline circuit 100 receives, at timing T4, the data D0 output from the previous circuit (not shown) to the signal 113 at timing T0. More specifically, at timing T4 which is the next rising timing of clock S, the pipeline register 110a latches the data D0, which is then output to the partial circuit 111a. Then, the partial circuit 111a performs the processing of the data D0.

Next, at timing T8 which is the next rising timing of clock S, the pipeline register 110b latches the data D0 processed by the partial circuit 111a, and outputs the data D0 to the partial circuit 111b. Then, the partial circuit 111b performs the processing of the data D0.

Hereinafter, in the similar way, from timings T12 to T16, the data D0 processed by the partial circuit 111b is processed by the partial circuits 111c and 111d through the pipeline registers 110c and 110d, respectively.

Last, at timing T20, the data D0 that is processed by the partial circuit 111d is output to the signal 114 through the pipeline register 110e.

In the similar way, the pipeline circuit 100 receives, at timing T8, the data D1 output from the previous circuit (not shown) to the signal 113 at timing T4. Specifically, at timing T8 which is the next rising timing of clock S, the pipeline register 110a latches the data D1, which is then output to the partial circuit 111a. Then, the partial circuit 111a performs the processing of the data D1.

Next, at timing T12, the pipeline register 110b latches the data D1 processed by the partial circuit 111a, and then outputs the data D1 to the partial circuit 111b. Then, the partial circuit 111b performs the processing of the data D1.

In the similar way, from timings T16 to T20, the data D1 processed by the partial circuit 111b is processed by the partial circuits 111c and 111d through the pipeline registers 110c and 110d, respectively.

Last, at timing T24, the data D1 processed by the partial circuit 111d is output to the signal 114 through the pipeline register 110e.

Hereinafter, in the similar way, data D2 to D7 output from the previous circuit (not shown) to the signal 113 at each of timings T8, T12, T16, T20, T24, and T28 are processed by the pipeline circuit 100, and then output to the signal 114 at each of timings T28, T32, T36, T40, T44, and T48 (not all of them are shown).

In the example shown in FIG. 15, it takes time corresponding to 20 cycles of clock F from when the data output from the previous circuit is processed by the pipeline circuit 100 to when the data is output to the signal 114 (e.g., the data D0 is input to the pipeline circuit 100 through the signal 113 at timing T0, and is output to the signal 114 from the pipeline circuit 100 at timing T20). In short, the latency of the data processing in the pipeline circuit 100 is 20 cycles of clock F.

On the other hand, the pipeline circuit 100 includes four-stage pipeline circuits of the partial circuits 111a, 111b, 111c, 111d, and the data processing is achieved by a pipeline operation. Accordingly, even though the latency is five cycles (20 cycles of clock F) of clock S, the data processing can be performed for each cycle of clock S. In summary, since the data processing can be performed for each of four cycles of clock F, the throughput of the data processing of the pipeline circuit 100 is 0.25 data/cycle (indicating that 0.25 data is processed for each cycle of clock F).

This is because the frequency of clock S is (¼) times as large as that of clock F, and thus the cycle time of clock S is four times as large as that of clock F. Thus, the throughput of the pipeline circuit 100 operated by clock S becomes (¼) times as large as that of the pipeline circuit 100 operated by clock F, and the latency of the pipeline circuit 100 operated by clock S becomes four times as large as that of the pipeline circuit 100 operated by clock F.

CITATION LIST

Patent Literature

[Patent Literature 1]
Japanese Unexamined Patent Application Publication No. 63-201725 (pages 3-4)

SUMMARY OF INVENTION

Technical Problem

The pipeline circuit according to the related art has the following problems. As described above, more typically, when the clock frequency is made (1/N)-fold where N is a positive integer, the throughput becomes (1/N)-fold and also the latency becomes N-fold. Accordingly, when the throughput is sufficient for a required performance but the latency is not sufficient for a required performance, the clock frequency cannot be reduced, which makes it difficult to reduce power.

Further, when the processing result of the pipeline circuit is used by the subsequent circuit, an increase in the latency causes waiting time until when the data arrives at the subsequent circuit, which may deteriorate the throughput of the whole processing.

The present invention has been made in order to solve those problems. The present invention aims to provide a pipeline circuit, a semiconductor device, and a pipeline control method capable of flexibly controlling clock frequencies regardless of whether a pipeline operation by a flow control is stopped or not, without significantly increasing a processing latency even if a clock frequency is decreased, and in response to performance requests for a processing throughput.

Solution to Problem

In order to solve the above-mentioned problems, a pipeline circuit, a semiconductor device, and a pipeline control method according to the present invention employ the following characteristic configurations. The following numbers (1) and (6) correspond to numbers in claims.

(1) A pipeline circuit including a plurality of stages of pipeline buffers, in which among P (P is a positive integer) clock signals from a first clock signal to a P-th clock signal, two successive clock signals whose phases are delayed each other by a predetermined phase are sequentially allocated to each of pipeline buffers from a pipeline buffer located at a previous stage of the pipeline circuit to a pipeline buffer located at a subsequent stage of the pipeline circuit, the clock signals being allocated so that two adjacent pipeline buffers share one clock signal having an identical phase among the two clock signals allocated to the two adjacent pipeline buffers, each of the pipeline buffers being operated by the two clock signals allocated to each of them, the P number of clock signals having phases delayed in the order from the first clock signal to the P-th clock signal.

(6) A pipeline control method controlling a pipeline circuit including a plurality of stages of pipeline buffers, in which among P (P is a positive integer) clock signals from a first clock signal to a P-th clock signal, two successive clock signals whose phases are delayed each other by a predetermined phase are sequentially allocated to each of pipeline buffers from a pipeline buffer located at a previous stage of the pipeline circuit to a pipeline buffer located at a subsequent stage of the pipeline circuit, the clock signals being allocated so that two adjacent pipeline buffers share one clock signal having an identical phase among the two clock signals allocated to the two adjacent pipeline buffers, each of the pipeline buffers being operated by the two clock signals allocated to each of them, the P number of clock signals having phases delayed in the order from the first clock signal to the P-th clock signal.

Advantageous Effects of Invention

According to a pipeline circuit, a semiconductor device, and a pipeline control method of the present invention, the following advantageous effects can be achieved.

First, even when the frequency of each of clock signals that drive a pipeline circuit is reduced, the processing latency does not increase unless there is caused a stop of the pipeline operation by a flow control. Further, even when there is caused a stop of the pipeline operation by the flow control, the processing latency only increases by the amount corresponding to the stop. Accordingly, the clock frequency can be flexibly reduced when the throughput is sufficient for a required performance, which makes it possible to reduce power consumption in the pipeline circuit.

Second, even when the clock frequency is reduced, the latency does not increase or only increases by the amount corresponding to the stop of the pipeline operation. Accordingly, the throughput of the whole processing does not reduce even when the processing result of the pipeline circuit is used by a subsequent circuit.

DESCRIPTION OF EMBODIMENTS

Hereinafter, preferred exemplary embodiments of a pipeline circuit, a semiconductor device, and a pipeline control method according to the present invention will be described with reference to the accompanying drawings. Described below are a pipeline circuit and a pipeline control method according to the present invention. However, such a pipeline circuit may be mounted on a semiconductor device that performs a pipeline operation. In particular, a communication server apparatus that concurrently processes a number of events in real time may be preferably applied as a semiconductor device that mounts a pipeline circuit according to the present invention.

(Characteristics of the Present Invention)

Prior to the description of the exemplary embodiments of the present invention, the outline of the characteristics of the present invention will be described first. A pipeline circuit according to the present invention is a pipeline circuit including a plurality of stages of pipeline buffers, in which among P (P is a positive integer) clock signals from a first clock signal to a P-th clock signal, two successive clock signals whose phases are delayed each other by a predetermined phase are sequentially allocated to each of pipeline buffers from a pipeline buffer located at a previous stage of the pipeline circuit to a pipeline buffer located at a subsequent stage of the pipeline circuit, the clock signals being allocated so that two adjacent pipeline buffers share one clock signal having an identical phase among the two clock signals allocated to the two adjacent pipeline buffers, each of the pipeline buffers being operated by the two clock signals allocated to each of them, the P number of clock signals having phases delayed in the order from the first clock signal to the P-th clock signal. In summary, the clock signals are allocated so that, in two adjacent pipeline buffers among the pipeline buffers to which two successive clock signals whose phases are delayed by a predetermined phase are sequentially allocated, the clock signal in the latter side of the previous pipeline buffer and the clock signal in the former side of the subsequent pipeline buffer have the same phase.

First Exemplary Embodiment

Figure 1:
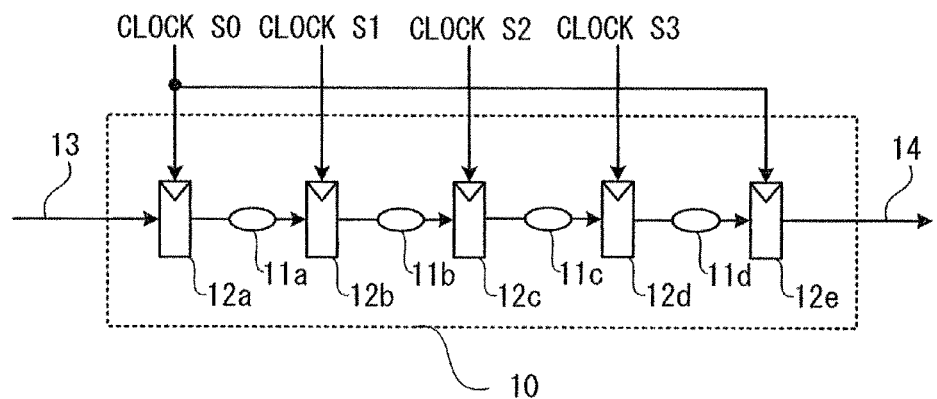
FIG. 1 is a block configuration diagram showing a block configuration of a pipeline circuit according to a first exemplary embodiment of the present invention.

Next, with reference to FIG. 1, a pipeline circuit according to a first exemplary embodiment of the present invention will be described. FIG. 1 is a block configuration diagram showing a block configuration of the pipeline circuit according to the first exemplary embodiment of the present invention. In FIG. 1, a pipeline circuit 10 processes data input to a signal 13 by partial circuits 11*a*, 11*b*, 11*c*, and 11*d* in pipeline, and then outputs the data to a signal 14. The signal 13 and the signal 14 are signals each including a plurality of bits.

More specifically, the pipeline circuit 10 includes four-stage pipeline circuits in order to achieve high operational frequency and high throughput. Specifically, in the pipeline circuit 10, the circuit that performs data processing is divided into four partial circuits 11*a*, 11*b*, 11*c*, and 11*d* by five-stage pipeline registers 12*a*, 12*b*, 12*c*, 12*d*, and 12*e*.

The five-stage pipeline registers 12a, 12b, 12c, 12d, and 12e each operates by any one of clock S0, clock 51, clock S2, and clock S3 that are four independent clock signals. In the example shown in FIG. 1, the pipeline registers 12a and 12e operate by clock S0, the pipeline register 12b operates by clock S1, the pipeline register 12c operates by clock S2, and the pipeline register 12d operates by clock S3.

It is assumed that each of the frequencies of clock S0, clock S1, clock S2, and clock S3 is (1/N) (N is a positive integer) times as large as the maximum value of the frequency of each of clock S0, clock S1, clock S2, and clock S3. At this time, the phase relation of clock S0, clock S1, clock S2, and clock S3 is as follows: (1) the phase of clock S1 is delayed by (360/N)° compared to clock S0, (2) the phase of clock S2 is delayed by (360/N)° compared to clock S1, and (3) the phase of clock S3 is delayed by (360/N)° compared to clock S2.

The phase difference of (360/N)° is equal to the cycle time when the frequency of each of clock S0, clock S1, clock S2, and clock S3 is the maximum value. At this time, clock signals whose phases are delayed by (360/N)° among clocks S0 to S3 are allocated in series from a previous pipeline register to a subsequent pipeline register of the pipeline circuit 10. Specifically, (a) clock S0 is allocated to the pipeline register 12a; (b) clock S1 is allocated to the pipeline register 12b; (c) clock S2 is allocated to the pipeline register 12c; (d) clock S3 is allocated to the pipeline register 12d; and (e) clock S0 is allocated to the pipeline register 12e.

Accordingly, as described above, (a) the pipeline register 12a operates by clock S0; (b) the pipeline register 12b operates by clock S1; (c) the pipeline register 12c operates by clock S2; (d) the pipeline register 12d operates by clock S3; and (e) the pipeline register 12e operates by clock S0.

The clock signals such as clock S0, clock S1, clock S2, and clock S3 can be easily generated by conventional clock generators. For example, they may be directly generated by an oscillator such as a Phased Lock Loop (PLL) circuit, or may be generated by dividing a frequency of a high-speed clock signal by a frequency divider.

Operation of First Exemplary Embodiment

Figure 2:
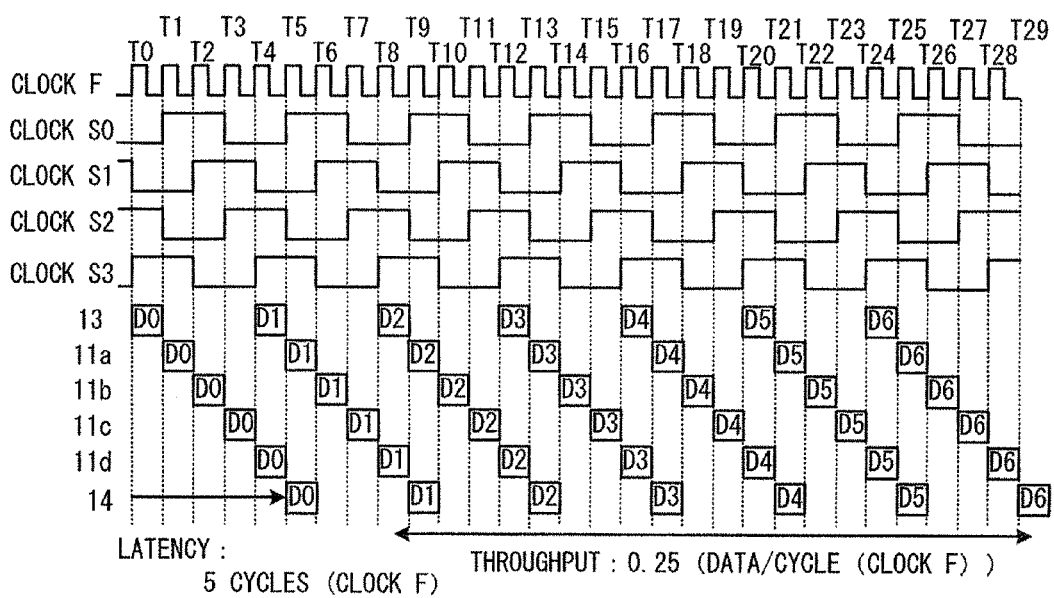
FIG. 2 is a time chart describing one example of a timing relation of data processing by the pipeline circuit shown in FIG. 1.

Referring next to FIG. 2, an operational example of the pipeline circuit 10 according to the first exemplary embodiment shown in FIG. 1 will be described. FIG. 2 is a time chart describing one example of a timing relation of data processing by the pipeline circuit 10 shown in FIG. 1, and shows a case when N=4. Further, for the sake of clarification, FIG. 2 shows a clock signal when the frequency of each of clock S0, clock S1, clock S2, and clock S3 is the maximum value as clock F.

In the time chart shown in FIG. 2, the frequency of each of clock S0, clock S1, clock S2, and clock S3 is (¼) times the frequency of clock F, which is the maximum value of the frequency of each of clock S0, clock S1, clock S2, and clock S3. Further, the phases of clock S0, clock S1, clock S2, and clock S3 are different by (360/4)° from one another: (1) the phase of clock S1 is delayed by (360/4)° compared to clock S0, (2) the phase of clock S2 is delayed by (360/4)° compared to clock S1, and (3) the phase of clock S3 is delayed by (360/4)° compared to clock S2.

In the time chart shown in FIG. 2, the pipeline circuit 10 receives, at timing T1, data D0 output from a previous circuit (not shown) to the signal 13 at timing T0. More specifically, at timing T1 which is a rising timing of clock S0, the pipeline register 12a that operates by clock S0 latches the data D0, which is output to the partial circuit 11a. Then, the partial circuit 11a performs processing of the data D0.

Next, at timing T2, which is a rising timing of clock S1, the pipeline register 12b that operates by clock S1 latches the data D0 processed by the partial circuit 11a, and then outputs the data D0 to the partial circuit 11b. Then, the partial circuit 11b performs the processing of the data D0.

Next, at timing T3, which is a rising timing of clock S2, the pipeline register 12c that operates by clock S2 latches the data D0 processed by the partial circuit 11b, and then outputs the data D0 to the partial circuit 11c. Then, the partial circuit 11c performs the processing of the data D0.

Next, at timing T4, which is a rising timing of clock S3, the pipeline register 12d that operates by clock S3 latches the data D0 processed by the partial circuit 11c, and then outputs the data D0 to the partial circuit 11d. Then, the partial circuit 11d performs the processing of the data D0.

Last, at timing T5 which is a rising timing of clock S0, the data D0 processed by the partial circuit 11d is output to the signal 14 through the pipeline register 12e operated by clock S0.

Similarly, at timing 15, the pipeline circuit 10 receives data D1 output to the signal 13 by the previous circuit (not shown) at timing T4. Specifically, at timing T5 which is a rising timing of clock S0, the pipeline register 12a operated by clock S0 latches the data D1, which is output to the partial circuit 11a. Then, the partial circuit 11a performs processing of the data D1.

Next, at timing 16 which is a rising timing of clock S1, the pipeline register 12b latches the data D1 processed by the partial circuit 11a operated by clock S1, and outputs the data D1 to the partial circuit 11b. Then, the partial circuit 11b performs the processing of the data D1.

In the following processing, in the similar way, at timings T7 and 18, the data D1 processed by the partial circuit 11b is processed by the partial circuits 11c and 11d through the pipeline registers 12c and 12d operated by clocks S2 and S3, respectively.

Last, at timing 19, the data D1 processed by the partial circuit 11d is output to the signal 14 through the pipeline register 12e.

In the following processing, as is similar to the operation stated above, data D2 to D6 output from the previous circuit (not shown) to the signal 13 at each of timings T8, T12, T16, T20, and T24 are processed by the pipeline circuit 10, and thereafter, the data are output to the signal 14 at each of timings T13, T17, T21, T25, and T29.

Described above is the case in which four clock signals are used in which phases are delayed by (360/4)° in the order of clock S0, clock S1, clock S2, and clock S3. The first exemplary embodiment may be similarly applied not only to such a case but also to a case in which any desired number of clock signals are used. More specifically, the clock signals whose phases are delayed by a predetermined phase may be allocated in series from the previous pipeline register to the subsequent pipeline register of the pipeline circuit 10.

Advantageous Effect of First Exemplary Embodiment

In the example of the time chart shown in FIG. 2, it takes time corresponding to five cycles of clock F from when the data output from the previous circuit is processed by the pipeline 10 to when the data is output to the signal 14 (e.g., the data D0 is input to the pipeline circuit 10 through the signal 13 at timing T0, and is output to the signal 14 from the pipeline circuit 10 at timing T5). In summary, the latency of the data processing of the pipeline circuit 10 is five cycles of clock F.

On the other hand, the pipeline circuit 10 includes four-stage pipeline circuits of partial circuits 11a, 11b, 11c, and 11d, and the data processing is achieved by the pipeline operation. Accordingly, even though the latency is five cycles, the data processing can be performed for each cycle of clocks S0 to S3. In summary, since the data processing can be performed for each of four cycles of clock F, the throughput of the data processing of the pipeline circuit 10 is (¼) data/cycle (indicating that data of (¼) is processed for one cycle of clock F).

This is because the frequency of each of clocks S0 to S3 is (¼) times as large as the frequency of clock F, which means the cycle time of each of clocks S0 to S3 is four times as long as that of clock F. In summary, in the first exemplary embodiment, when the clock frequency is made (¼)-fold, the throughput becomes (¼)-fold, whereas the latency is kept one-fold and does not increase as in the related art. More typically, when the frequency is made (1/N)-fold, where N is a positive integer, the throughput becomes (1/N)-fold. On the other hand, the latency is kept one-fold and does not increase.

Figure 3:
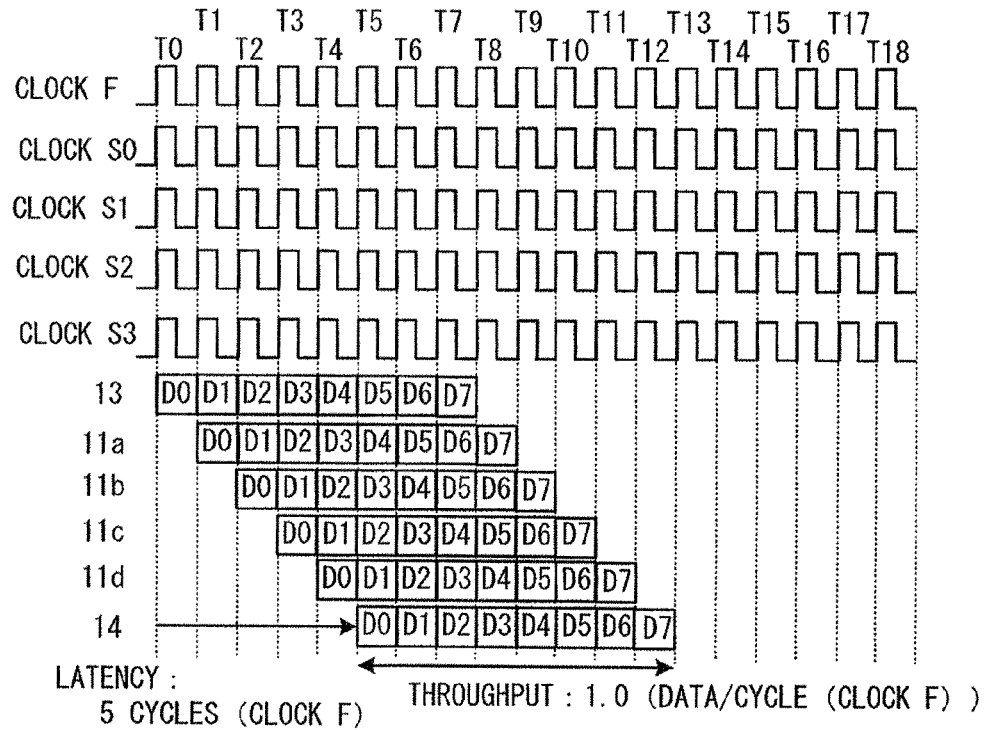
FIG. 3 is a time chart describing another example of the timing relation of data processing by the pipeline circuit shown in FIG. 1.

For example, FIG. 3 is a time chart describing another example of the timing relation of the data processing by the pipeline circuit 10 in FIG. 1, and shows a case when N=1. At this time, the frequency of each of clock S0, clock S1, clock S2, and clock S3 is (1/1) times the frequency of clock F, which means equal to the frequency of clock F.

In such a case, as is clear from FIG. 3, while the throughput becomes (1/1)-fold, the latency is kept one-fold, which is similar to the case in FIG. 2.

Figure 4:
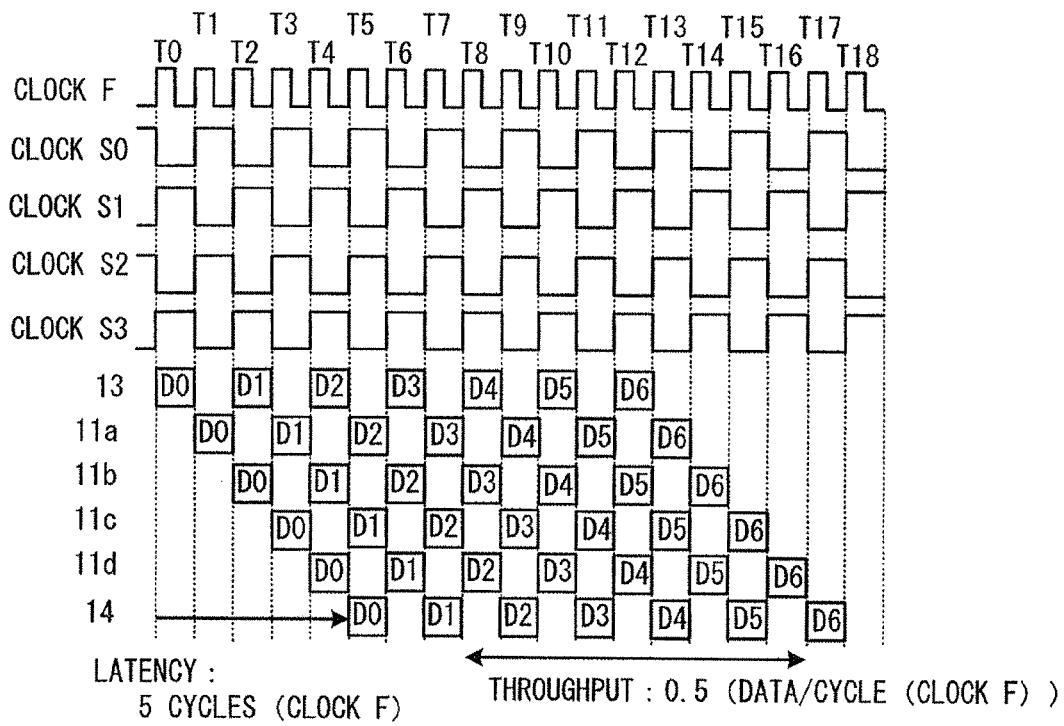
FIG. 4 is a time chart describing another different example of the timing relation of data processing by the pipeline circuit shown in FIG. 1.

FIG. 4 is a time chart describing another example of the timing relation of the data processing by the pipeline circuit 10 in FIG. 1, and shows a case when N=2. At this time, the frequency of each of clock S0, clock S1, clock S2, and clock S3 is (½) times as large as that of clock F.

In such a case, as is clear from FIG. 4, while the throughput becomes (½)-fold, the latency is kept one-fold, which is similar to the case shown in FIG. 2.

Accordingly, when the throughput is sufficient for a required performance, the clock frequency can be flexibly reduced without increasing the processing latency, which can reduce the power consumption of the pipeline circuit 10. Further, since the processing latency does not increase even when the clock frequency is lowered, the throughput of the whole processing does not decrease even when the processing result in the pipeline circuit 10 is used in subsequent processing.

Second Exemplary Embodiment

Next, a pipeline circuit according to a second exemplary embodiment of the present invention will be described. Described in the above first exemplary embodiment is a case in which the frequency of each of the clock signals that drive the pipeline circuit is made (1/N) (N is a positive integer) times as large as the maximum value of the frequency. In the second exemplary embodiment, with reference to FIG. 5, a case will be described in which the frequency of each of the clock signals that drive the pipeline circuit is made a multiple of a rational number specified by (M/N)-fold (M is a positive integer, and N is a positive integer larger than M) with respect to the maximum value of the frequency.

Figure 5:
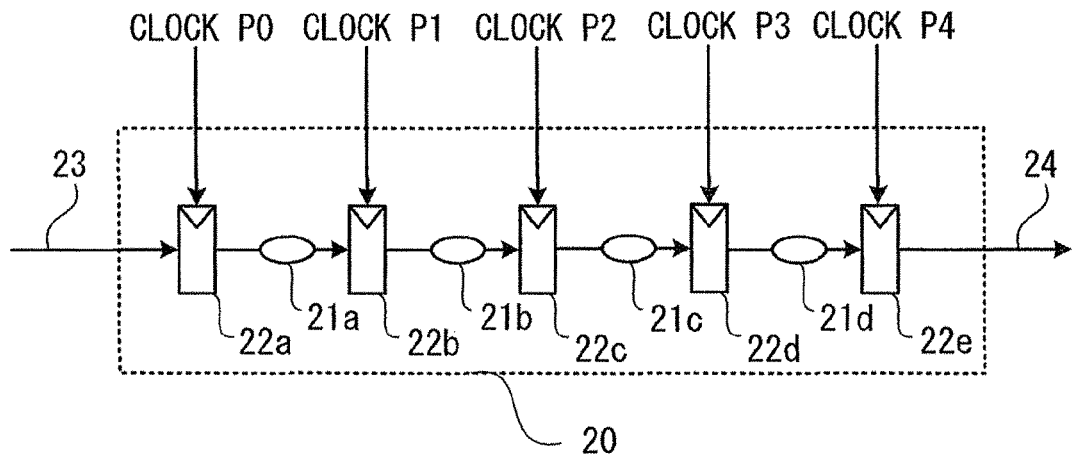
FIG. 5 is a block configuration diagram showing a block configuration of a pipeline circuit according to a second exemplary embodiment of the present invention.

FIG. 5 is a block configuration diagram showing a block configuration of a pipeline circuit according to the second exemplary embodiment of the present invention. In FIG. 5, a pipeline circuit 20 processes data input from a signal 23 by partial circuits 21a, 21b, 21c, and 21d in pipeline, and then outputs the data to a signal 24. Now, the signal 23 and the signal 24 are signals each including a plurality of bits.

More specifically, the pipeline circuit 20 includes four-stage pipeline circuits to achieve high operational frequency and high throughput. Specifically, in the pipeline circuit 20, the circuit that performs data processing is divided into the four partial circuits 21a, 21b, 21c, and 21d by five-stage pipeline registers 22a, 22b, 22c, 22d, and 22e.

Each of the five-stage pipeline registers 22a, 22b, 22c, 22d, and 22e operates by one of five independent clock signals: clock P0, clock P1, clock P2, clock P3, and clock P4. In the example shown in FIG. 5, the pipeline register 22a operates by clock P0, the pipeline register 22b operates by clock P1, the pipeline register 22c operates by clock P2, the pipeline register 22d operates by clock P3, and the pipeline register 22e operates by clock P4.

It is assumed here that the frequency of each of clocks P0 to P4 is (M/N) (M is a positive integer, and N is a positive integer larger than M) times as large as the maximum value of the frequency of each of clocks P0 to P4. Further, when the cycle time when the frequency of each of clocks P0 to P4 is the maximum value is Tcyc, it is assumed that the phase relation of clocks P0 to P4 is as follows: (1) the phase of clock P1 is delayed by Tcyc compared to clock P0, (2) the phase of clock P2 is delayed by Tcyc compared to clock P1, (3) the phase of clock P3 is delayed by Tcyc compared to clock P2, and (4) the phase of clock P4 is delayed by Tcyc compared to clock P3.

At this time, clock signals whose phases are delayed by Tcyc among clocks P0 to P4 are allocated in series from the previous pipeline register to the subsequent pipeline register of the pipeline circuit 20. Specifically, (a) clock P0 is allocated to the pipeline register 22a; (b) clock P1 is allocated to the pipeline register 22b; (c) clock P2 is allocated to the pipeline register 22c; (d) clock P3 is allocated to the pipeline register 22d; and (e) clock P4 is allocated to the pipeline register 22e.

Accordingly, as described above, (a) the pipeline register 22a operates by clock P0; (b) the pipeline register 22b operates by clock P1; (c) the pipeline register 22c operates by clock P2; (d) the pipeline register 22d operates by clock P3; and (e) the pipeline register 22e operates by clock P4.

Figure 6:
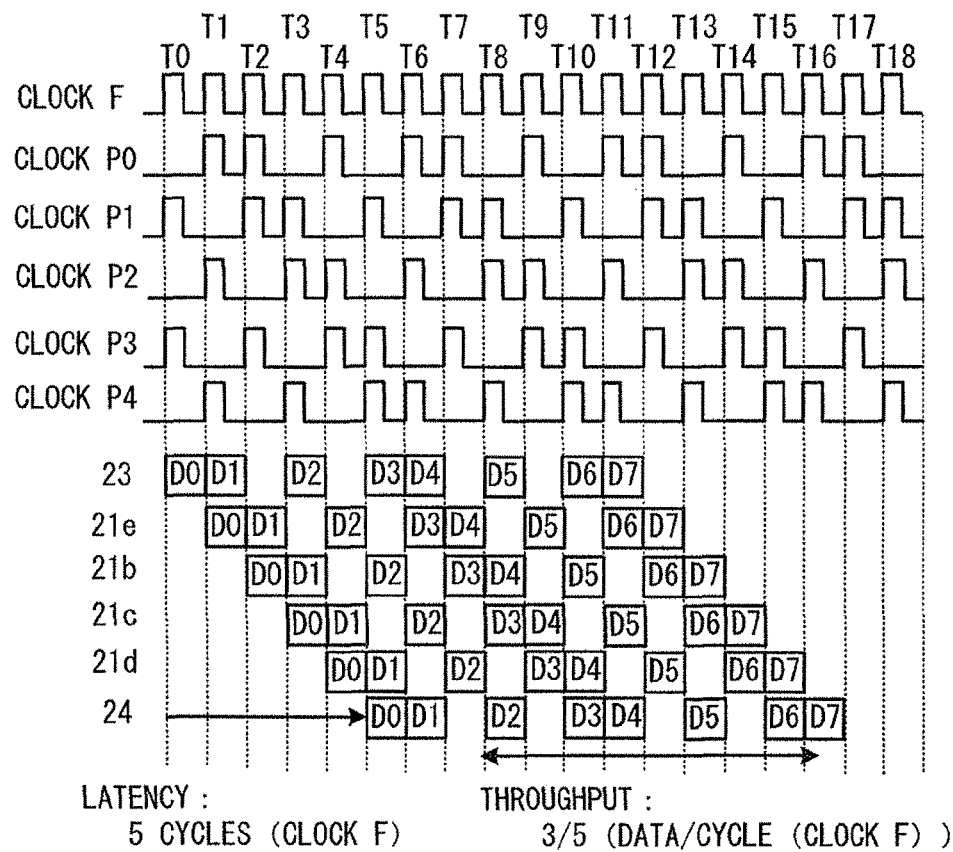
FIG. 6 is a time chart for describing one example of a clock generated by dividing a frequency of a high-speed clock signal F by a rational number with a frequency dividing ratio specified by (M/N)
Figure 7:
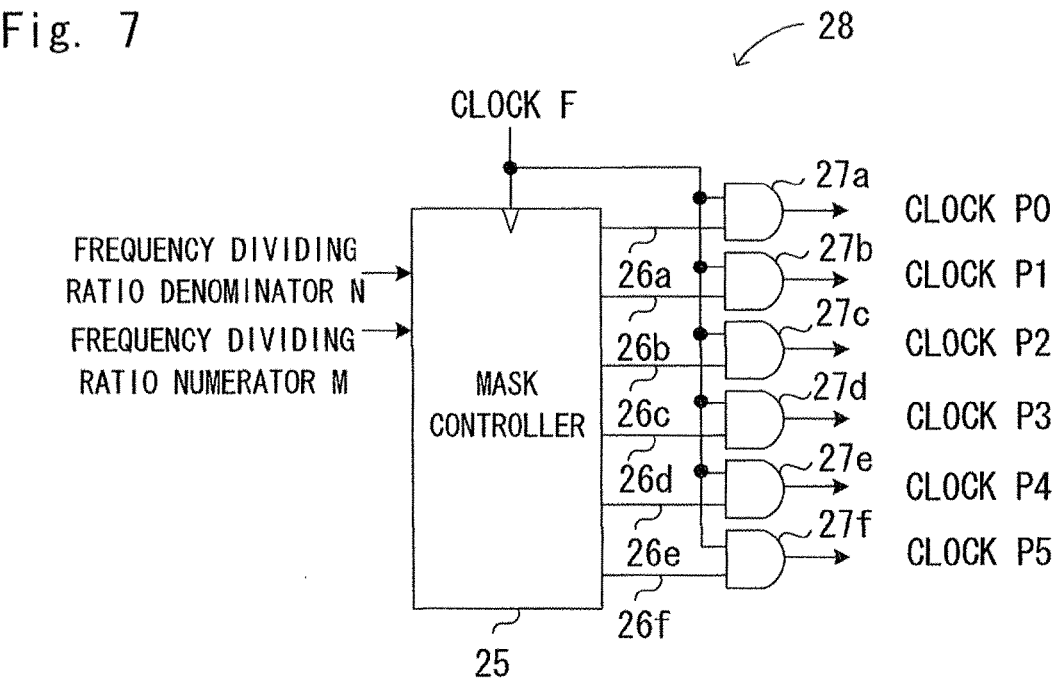
FIG. 7 is a block configuration diagram showing one example of a block configuration of a clock signal frequency divider forming the pipeline circuit shown in FIG. 5.
Figure 8:
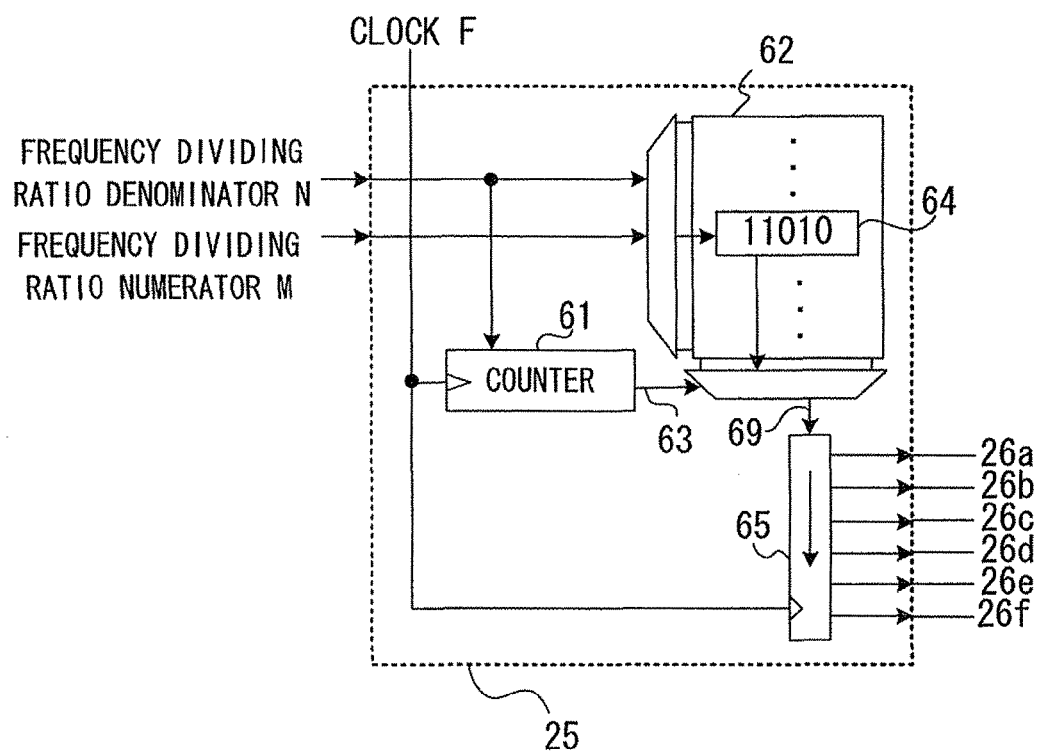
FIG. 8 is a block configuration example showing one example of a block configuration of a mask controller forming the clock signal frequency divider shown in FIG. 7.

Clocks P0 to P4 may be generated by dividing a frequency of a high-speed clock signal by a rational number with a frequency dividing ratio specified by (M/N), for example. In the second exemplary embodiment, frequency division by a rational number is achieved by appropriately masking (thinning) the clock pulse of the high-speed clock signal, so as to generate clocks P0 to P4. Referring to FIGS. 6 to 8, the generation method of clocks P0 to P4 will be described in detail.

FIG. 6 is a time chart for describing one example of clocks P0 to P4 generated by dividing a frequency of a high-speed clock signal F by a rational number with a frequency dividing ratio specified by (M/N), and shows an example when a frequency dividing ratio (M/N)=(3/5). Note that FIG. 6 also shows a time chart describing one example of the timing relation of the data processing by the pipeline circuit 20 in FIG. 5.

FIG. 6 shows an example of clocks P0 to P4 generated by dividing the frequency of clock F which is a high-speed clock signal by a frequency dividing ratio (3/5). In summary, clocks P0 to P4 with the frequency dividing ratio (M/N) can be generated by appropriately masking (N−M) number of clock pulses among the N number of clock pulses of clock F. More specifically, clocks P0 to P4 having a frequency dividing ratio of (3/5) are generated by masking desired two clock pulses among the five successive clock pulses of clock F.

For example, in the example of FIG. 6, clock P0 having a frequency dividing ratio of (3/5) is generated by masking two clock pulses positioned at timings T3 and T5 among five successive clock pulses positioned at timings T1 to T5 of clock F. Similarly, clock P0 is generated by masking two clock pulses positioned at timings T8 and T10 among five successive clock pulses positioned at timings T6 to T10 of clock F. Also at timing T11 and the following processing, in the similar way, the clock P0 is generated by masking two clock pulses among the five successive clock pulses of clock F.

Further, clock P1 having a frequency dividing ratio of (3/5) is generated by masking two clock pulses positioned at timings T4 and T6 among five successive clock pulses positioned at timings T2 to T6 of clock F. Further, clock P2 having a frequency dividing ratio of (3/5) is generated by masking two clock pulses positioned at timings T5 and T7 among five successive clock pulses positioned at timings T3 to T7 of clock F. Further, clock P3 having a frequency dividing ratio of (3/5) is generated by masking two clock pulses positioned at timings T6 and T8 among five successive clock pulses positioned at timings T4 to T8 of clock F. Furthermore, clock 94 having a frequency dividing ratio of (3/5) is generated by masking two clock pulses positioned at timings T7 and T9 among five successive clock pulses positioned at timings T5 to T9 of clock F.

When clocks P0 to P4 are generated without masking the clock pulses of clock F, the frequency of each of clocks P0 to P4 becomes maximum. At this time, the maximum value of the frequency of each of clocks P0 to P4 is equal to the frequency of clock F.

Accordingly, when the cycle time of clock F is Tcyc, the phase relation of clocks P0 to P4 is as follows: (1) the phase of clock P1 is delayed by Tcyc compared to clock P0, (2) the phase of clock P2 is delayed by Tcyc compared to clock P1, (3) the phase of clock P3 is delayed by Tcyc compared to clock P2, and (4) the phase of clock P4 is delayed by Tcyc compared to clock P3.

Referring next to FIG. 7, a clock signal frequency divider forming the pipeline circuit 20 according to the second exemplary embodiment of the present invention will be described. FIG. 7 is a block configuration diagram showing one example of a block configuration of the clock signal frequency divider forming the pipeline circuit 20 shown in FIG. 5, and shows a case in which clocks P0 to P5 having a frequency dividing ratio of (M/N) are generated.

A clock generator 28 shown in FIG. 7 masks (N−M) number of clock pulses among N successive number of clock pulses of clock F (input clock signal) based on the frequency dividing ratio specified by (M/N) (M is a positive integer, and N is a positive integer larger than M) of the frequency dividing ratio denominator N and the frequency dividing ratio numerator M that are input to the clock generator 28, so as to generate clocks P0 to P5 (output clock signals) obtained by dividing a frequency of clock F by a rational number with the frequency dividing ratio of (M/N).

The clock signal frequency divider 28 mainly includes mask circuits 27a, 27b, 27c, 27d, 27e, 27f and a mask controller 25. The mask circuit 27a has a function of masking the clock pulse of clock F according to a mask signal 26a input to the mask circuit 27a so as to generate and output clock P0. Similarly, the mask circuit 27b has a function of masking the clock pulse of clock F according to a mask signal 26b input to the mask circuit 27b so as to generate and output clock P1.

Similarly, the mask circuit 27c has a function of masking the clock pulse of clock F according to a mask signal 26c input to the mask circuit 27c so as to generate and output clock P2. Similarly, the mask circuit 27d has a function of masking the clock pulse of clock F according to a mask signal 26d input to the mask circuit 27d so as to generate and output clock P3. Similarly, the mask circuit 27e has a function of masking the clock pulse of clock F according to a mask signal 26e input to the mask circuit 27e so as to generate and output clock P4. Similarly, the mask circuit 27f has a function of masking the clock pulse of clock F according to a mask signal 26f input to the mask circuit 27f so as to generate and output clock P5.

The mask controller 25 has a function of outputting to the mask circuit 27a the mask signal 26a in which mask timing to mask (N−M) number of clock pulses among timings of N successive number of clock pulses of clock F is allocated to the timing of clock P0 based on the frequency dividing ratio denominator N and the frequency dividing ratio numerator M input to the mask controller 25.

Further, the mask controller 25 has a function of outputting to the mask circuit 27b the mask signal 26b in which mask timing to mask (N−M) number of clock pulses among timings of N successive number of clock pulses of clock F is allocated to the timing which is delayed from the timing of clock P0 by Tcyc based on the frequency dividing ratio denominator N and the frequency dividing ratio numerator M input to the mask controller 25.

Further, the mask controller 25 has a function of outputting to the mask circuit 27c the mask signal 26c in which mask timing to mask (N−M) number of clock pulses among timings of N successive number of clock pulses of clock F is allocated to the timing which is delayed from the timing of clock P1 by Tcyc based on the frequency dividing ratio denominator N and the frequency dividing ratio numerator M input to the mask controller 25.

Further, the mask controller 25 has a function of outputting to the mask circuit 27d the mask signal 26d in which mask timing to mask (N−M) number of clock pulses among timings of N successive number of clock pulses of clock F is allocated to the timing which is delayed from the timing of clock P2 by Tcyc based on the frequency dividing ratio denominator N and the frequency dividing ratio numerator M input to the mask controller 25.

Further, the mask controller 25 has a function of outputting to the mask circuit 27e the mask signal 26e in which mask timing to mask (N−M) number of clock pulses among timings of N successive number of clock pulses of clock F is allocated to the timing which is delayed from the timing of clock P3 by Tcyc based on the frequency dividing ratio denominator N and the frequency dividing ratio numerator M input to the mask controller 25.

Further, the mask controller 25 has a function of outputting to the mask circuit 27f a mask signal 26f in which mask timing to mask (N−M) number of clock pulses among timings of N successive number of clock pulses of clock F is allocated to the timing which is delayed from the timing of clock P4 by Tcyc based on the frequency dividing ratio denominator N and the frequency dividing ratio numerator M input to the mask controller 25.

Note that clock F, the frequency dividing ratio denominator N, and the frequency dividing ratio numerator Marc supplied from a higher-level circuit (not shown).

Referring next to FIG. 8, a specific example of the mask controller 25 shown in FIG. 7 will be described. FIG. 8 is a block configuration diagram showing one example of a block configuration of the mask controller 25 forming the clock signal frequency divider 28 shown in FIG. 7.

In FIG. 8, the mask controller 25 has a function of generating a count value indicating a relative phase with respect to clock F of the output clock signal by counting the clock pulse of clock F based on the frequency dividing ratio denominator N and the frequency dividing ratio numerator M that are input to the mask controller 25, to generate and output the mask signals 26a to 26f to which mask timings are allocated based on the count value that is generated.

In the second exemplary embodiment shown in FIG. 8, the mask controller 25 includes a counter 61, a table circuit 62, and a shift register 65. Further, the frequency dividing ratio denominator N and the frequency dividing ratio numerator M input to the mask controller 25 each includes parallel bit data of a plurality of bits.

The counter 61 has functions of counting the clock pulse of clock F, and resetting the count value to "0" when a count value 63 of the counter 61 reaches the frequency dividing ratio denominator N, thereby outputting the count value 63 from 0" to "N–1" indicating the relative phase with respect to clock F of the output clock signal. Accordingly, the cycle number in which the phase relation between clock F and the output clock signal comes full cycle is output from the counter 61 as the count value 63.

The table circuit 62 has a function of holding table data 64 indicating the necessity of the mask (in the example shown in FIG. 8, data "11010" in which the third number and the fifth number are "0" when N=5 and M=3) in a table format in advance for each of combinations of the count value 63, the frequency dividing ratio denominator N, and the frequency dividing ratio numerator M, and a function of outputting the table data according to the combination of the count value 63, the frequency dividing ratio denominator N, and the frequency dividing ratio numerator M that are input as a mask timing signal 69.

The shift register 65 sequentially shifts the mask timing signals 69 that are input to the shift register 65 for each cycle of clock F, and outputs the shifted signals as the mask signals 26a to 26f. Accordingly, (1) the mask signal 26a is a value of the table data 64; (2) the mask signal 261) is a value obtained by shifting the mask signal 26a by one cycle of clock F; (3) similarly, the mask signal 26c is a value obtained by shifting the mask signal 26b by one cycle of clock F; (4) similarly, the mask signal 26d is a value obtained by shifting the mask signal 26c by one cycle of clock F; (5) similarly, the mask signal 26e is a value obtained by shifting the mask signal 26d by one cycle of clock F; and (6) similarly, the mask signal 26f is a value obtained by shifting the mask signal 26e by one cycle of clock F.

According to the mask controller 25 shown in FIG. 8, the mask signals 26a to 26f are output for each clock pulse of clock F for masking the clock pulses of clock F in the mask circuits 27a to 27f of the clock signal frequency divider 28 shown in FIG. 7 from the table circuit 62 through the shift register 65 according to the frequency dividing ratio denominator N, the frequency dividing ratio numerator M, and the count value 63.

Operation of Second Exemplary Embodiment

Referring again to FIG. 6, an operational example of the pipeline circuit 20 according to the second exemplary embodiment shown in FIG. 5 will be described. FIG. 6 also shows a time chart for describing one example of the timing relation of the data processing by the pipeline circuit 20 in FIG. 5 when a frequency dividing ratio (M/N)=(3/5).

In the time chart shown in FIG. 6, the pipeline circuit 20 receives, at timing T1, the data D0 output from a previous circuit (not shown) to the signal 23 at timing T0. Specifically, at timing T1 which is one of rising timing of clock P0, the pipeline register 22a that operates by clock P0 latches the data D0, which is then output to the partial circuit 21a. Then, the partial circuit 21a performs the processing of the data D0.

Next, at timing T2 which is one of rising timing of clock P1, the pipeline register 22b that operates by clock P1 latches the data D0 processed by the partial circuit 21a, and then outputs the data D0 to the partial circuit 21b. Then, the partial circuit 21b performs the processing of the data D0.

Next, at timing T3 which is one of rising timing of clock P2, the pipeline register 22c that operates by clock 92 latches the data D0 processed by the partial circuit 21b, and then outputs the data D0 to the partial circuit 21c. Then, the partial circuit 21c performs the processing of the data D0.

Next, at timing T4 which is one of rising timing of clock P3, the pipeline register 22d that operates by clock P3 latches the data D0 which is processed by the partial circuit 21c, and outputs the data D0 to the partial circuit 21d. Then, the partial circuit 21d performs the processing of the data D0.

Last, at timing T5 which is one of rising timing of clock P4, the data D0 processed by the partial circuit 21d is output to the signal 24 through the pipeline register 22e operated by clock 94.

In the similar way, the pipeline circuit 20 receives, at timing T2, the data D1 output from the previous circuit (not shown) to the signal 13 at timing T1. More specifically, at timing T2 which is one of rising timing of clock P0, the pipeline register 22a that operates by clock P0 latches the data D1, which is then output to the partial circuit 21a. Then, the partial circuit 21a performs the processing of the data D1.

Next, at timing T3 which is one of rising timing of clock P1, the pipeline register 22b that operates by clock P1 latches the data D1 which is processed by the partial circuit 21a, and then outputs the data D1 to the partial circuit 21b. Then, the partial circuit 21b performs the processing of the data D1.

In the following processing, in the similar way, the data D1 processed by the partial circuit 21b is processed by the partial circuits 21c and 21d through the pipeline registers 22c and 22d that operate at clocks P2 and P3 from timings T4 to T5, respectively.

Last, at timing T6, the data D1 processed by the partial circuit 21d is output to the signal 14 through the pipeline register 22e.

In the following processing, in the similar way, the data D2 to D7 output to the signal 23 from the previous circuit (not shown) at each of timings T3, T5, T6, T8, T10, and T11 are processed by the pipeline circuit 20, and then output to the signal 24 at each of timings T8, T10, T11, T13, T15, and T16.

Described above is the case in which five clock signals having phases delayed in the order of clocks P0 to P4 are used. The second exemplary embodiment may be similarly applied to other cases in which any desired number of clock signals are used. More specifically, clock signals whose phases are delayed in series may be sequentially allocated from the previous pipeline register to the subsequent pipeline register of the pipeline circuit 20.

Advantageous Effect of Second Exemplary Embodiment

In the example of the time chart shown in FIG. 6, it takes time corresponding to five cycles of clock F from when the data output from the previous circuit is processed by the pipeline circuit 20 until when the data is output to the signal 24 (e.g., the data D0 is input to the pipeline circuit 20 through the signal 23 at timing T0, and is output from the pipeline circuit 20 to the signal 24 at timing T5). In summary, the latency of the data processing of the pipeline circuit 20 is five cycles of clock F.

On the other hand, the pipeline circuit 20 includes four-stage pipeline circuits of partial circuits 21a, 21b, 21c, 21d, and the data processing is achieved by the pipeline operation. Accordingly, data processing can be performed for each cycle of the clocks P0 to P4 even though the latency is five cycles. In summary, since the data processing can be performed for each of three cycles among the five cycles of clock F, the throughput of the data processing of the pipeline circuit 20 is (3/5) data/cycle (indicating that data of (3/5) is processed for each cycle of clock F).

This is because the frequency of each of clocks P0 to P4 is (3/5) times as large as the frequency of clock F, which means the cycle time of each of clocks P0 to P4 is (5/3) times as large as that of clock F. In summary, according to the second exemplary embodiment, when the clock frequency is made (3/5)-fold, the throughput becomes (3/5)-fold whereas the latency is kept one-fold, and does not increase as in the related art. More typically, when the frequency is made (M/N)-fold (M is a positive integer, and N is a positive integer larger than M), the throughput becomes (M/N)-fold. Meanwhile, the latency is kept one-fold and does not increase. For example, in the second exemplary embodiment, the frequency of each of clocks P0 to P4 is (3/5) times as large as that of clock F, which means the cycle time of each of clocks P0 to P4 is (5/3) times as large as that of clock F on average. In summary, in the second exemplary embodiment, when the clock frequency is made (3/5)-fold, the throughput becomes (3/5)-fold whereas the latency is kept one-fold.

Accordingly, when the throughput is sufficient for a required performance, the clock frequency can be flexibly reduced by a desired multiple of a rational number specified by (M/N)-fold without increasing the processing latency, which can reduce power consumption in the pipeline circuit 20. Furthermore, since the processing latency does not increase even when the clock frequency is reduced, the throughput of the whole processing does not reduce even when the processing result of the pipeline circuit 20 is used in the subsequent processing.

Third Exemplary Embodiment

Next, a pipeline circuit according to a third exemplary embodiment of the present invention will be described. In the third exemplary embodiment, a case will be described with reference to FIG. 9 in which, in the pipeline circuit having a flow control function, the frequency of each of the clock signals that drive the pipeline circuit is made a multiple of a rational number specified by (M/N)-fold (M is a positive integer, and N is a positive integer larger than M) with respect to the maximum value of the frequency.

Figure 9:
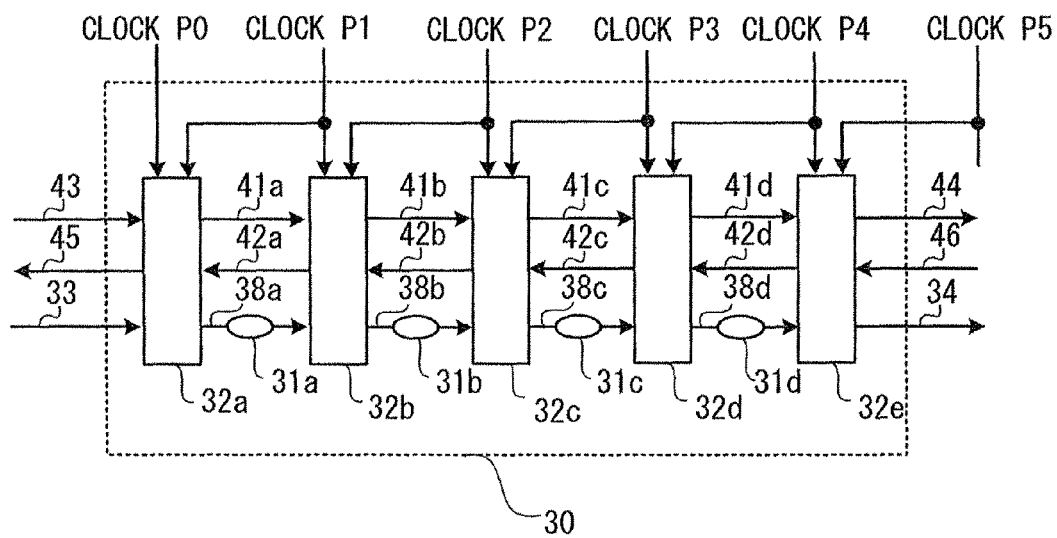
FIG. 9 is a block configuration diagram showing a block configuration of a pipeline circuit according to a third exemplary embodiment of the present invention.

FIG. 9 is a block configuration diagram showing a block configuration of a pipeline circuit according to the third exemplary embodiment of the present invention. In FIG. 9, a pipeline circuit 30 processes data input from a signal 33 by partial circuits 31a, 31b, 31c, and 31d in pipeline, and outputs the data to a signal 34. In this example, the signal 33 and the signal 34 are signals each including a plurality of bits.

More specifically, the pipeline circuit 30 includes four-stage pipeline circuits in order to achieve high operational frequency and high throughput. Specifically, the circuit that performs the data processing in the pipeline circuit 30 is divided into the four partial circuits 31a, 31b, 31c, and 31d by five-stage pipeline buffers 32a, 32b, 32c, 32d, and 32e.

Further, the pipeline circuit 30 includes input/output signals for controlling flow of data processed by the pipeline circuit 30 between a previous circuit (not shown) and a subsequent circuit (not shown).

More specifically, a data request signal 43 is input from the previous circuit (not shown), and a data response signal 45 is output to the previous circuit (not shown). The data request signal 43 is a signal indicating that the previous circuit has output data to the signal 33. On the other hand, the data response signal 45 is a signal indicating that the pipeline buffer 32a (or pipeline circuit 30) is capable of receiving data output to the signal 33.

Further, a data request signal 44 is output to the subsequent circuit (not shown) and a data response signal 46 is received from the subsequent circuit (not shown). The data request signal 44 is a signal indicating that the pipeline buffer 32e (or pipeline circuit 30) has output the data to the signal 34. Meanwhile, the data response signal 46 is a signal indicating that the subsequent circuit is able to receive the data output to the signal 34.

Furthermore, the pipeline circuit 30 includes signals for controlling flow of data between the pipeline buffers 32a to 32e.

More specifically, the pipeline buffer 32a receives the data request signal 43 from the previous circuit (not shown) and outputs the data response signal 45 to the previous circuit (not shown). In addition, the pipeline buffer 32a outputs a data request signal 41a to the subsequent pipeline buffer 32b, and receives a data response signal 42a from the pipeline buffer 32b. The data request signal 41a is a signal indicating that the pipeline buffer 32a has output the data to a signal 38a. Meanwhile, the data response signal 42a is a signal indicating that the pipeline buffer 32b is capable of receiving the data output to the signal 38a.

In the similar way, the pipeline buffer 32b receives the data request signal 41a from the previous pipeline buffer 32a, and outputs the data response signal 42a to the pipeline buffer 32a. In addition, the pipeline buffer 32b outputs a data request signal 41b to the subsequent pipeline buffer 32c, and receives a data response signal 42b from the pipeline buffer 32c. The data request signal 41b is a signal indicating that the pipeline buffer 32b has output the data to a signal 38b. Meanwhile, the data response signal 42b is a signal indicating that the pipeline buffer 32c is capable of receiving the data output to the signal 38b.

In the similar way, the pipeline buffer 32c receives the data request signal 41b from the previous pipeline buffer 32b, and outputs the data response signal 42b to the pipeline buffer 32b. In addition, the pipeline buffer 32c outputs a data request signal 41c to the subsequent pipeline buffer 32d, and receives a data response signal 42c from the pipeline buffer 32d. The data request signal 41c is a signal indicating that the pipeline buffer 32c has output the data to a signal 38c. Meanwhile, the data response signal 42c is a signal indicating that the pipeline buffer 32d is capable of receiving the data output to the signal 38c.

In the similar way, the pipeline buffer 32d receives the data request signal 41c from the previous pipeline buffer 32c, and outputs the data response signal 42c to the pipeline buffer 32c. In addition, the pipeline buffer 32d outputs a data request signal 41d to the subsequent pipeline buffer 32e, and receives a data response signal 42d from the pipeline buffer 32e. The data request signal 41d is a signal indicating that the pipeline buffer 32d has output the data to a signal 38d. Meanwhile, the data response signal 42d is a signal indicating that the pipeline buffer 32e is capable of receiving the data output to the signal 38d.

In the similar way, the pipeline buffer 32e receives the data request signal 41d from the previous pipeline buffer 32d, and outputs the data response signal 42d to the pipeline buffer 32d. In addition, the pipeline buffer 32e outputs the data request signal 44 to the subsequent circuit (not shown), and receives the data response signal 46 from the subsequent circuit (not shown).

Each of the five-stage pipeline buffers 32a, 32b, 32c, 32d, and 32e operates by two clocks among clock P0, clock P1, clock P2, clock P3, clock P4, and clock P5 that are six independent clock signals. In the example shown in FIG. 9, the pipeline buffer 32a operates by clocks P0 and P1, the pipeline buffer 32b operates by clocks P1 and P2, the pipeline buffer 32c operates by clocks P2 and P3, the pipeline buffer 32d operates by clocks P3 and P4, and the pipeline buffer 32e operates by clocks P4 and P5.

It is assumed that the frequency of each of clocks P0 to P5 is (M/N) times as large as the maximum value of the frequency of each of clocks P0 to P5 (M is a positive integer, and N is a positive integer larger than M). Further, when the cycle time when the frequency of each of clocks P0 to P5 is the maximum value is Tcyc, the phase relation of clocks P0 to P5 is as follows: (1) the phase of clock P1 is delayed by Tcyc compared to clock P0, (2) the phase of clock P2 is delayed by Tcyc compared to clock P1, (3) the phase of clock P3 is delayed by Tcyc compared to clock P2, (4) the phase of clock P4 is delayed by Tcyc compared to clock P3, and (5) the phase of clock P5 is delayed by Tcyc compared to clock P4.

At this time, two successive clock signals among clocks P0 to 95 whose phases are delayed by a predetermined phase Tcyc are allocated in order from the previous pipeline buffer to the subsequent pipeline buffer of the pipeline circuit 30. At this time, the clock signals are allocated so that one clock signal having an identical phase among the two clock signals that are allocated is shared between adjacent pipeline buffers. In summary, when two successive clock signals among clocks P0 to P5 whose phases are delayed by a predetermined phase are sequentially allocated to each of the pipeline buffers 32a to 32e, the phase of the latter clock signal allocated to the previous pipeline buffer is made equal to the phase of the former clock signal allocated to the subsequent pipeline buffer. More specifically, (a) clock P0 and clock P1 are allocated to the pipeline buffer 32a; (b) clock P1 and clock 92 are allocated to the pipeline buffer 32b; (c) clock P2 and clock P3 are allocated to the pipeline buffer 32c; (d) clock P3 and clock P4 are allocated to the pipeline buffer 32d; and (e) clock P4 and clock P5 are allocated to the pipeline buffer 32e.

Accordingly, as described above, (a) the pipeline buffer 32a operates by clock P0 and clock P1; (b) the pipeline buffer 32b operates by clock P1 and clock P2; (c) the pipeline buffer 32c operates by clock P2 and clock P3; (d) the pipeline buffer 32d operates by clock P3 and clock P4; and (e) the pipeline buffer 32e operates by clock P4 and clock P5.

As described above, one of the characteristics of the third exemplary embodiment is that two successive clock signals among clocks P0 to P5 whose phases are delayed by Tcyc are allocated to each of the pipeline buffers 32a to 32e so that one clock signal having an identical phase is shared between adjacent pipeline buffers. According to this feature, even when the clock frequency is reduced by performing frequency division by a rational number in which a frequency is divided by (M/N) (M is a positive integer, and N is a positive integer larger than M), the flow control function that normally operates can be achieved.

Note that clocks P0 to P5 may be generated by the clock signal quency divider 28 shown in FIG. 7 according to the second exemplary embodiment, for example.

Figure 10:
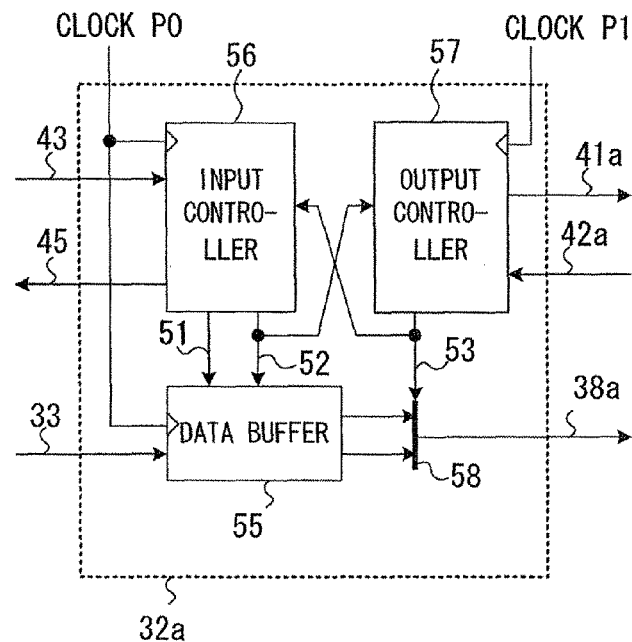
FIG. 10 is a block configuration diagram showing a block configuration example of a pipeline buffer forming the pipeline circuit shown in FIG. 9

Next, the details of the pipeline buffer according to the third exemplary embodiment of the present invention will be described with reference to FIG. 10. FIG. 10 is a block configuration diagram showing a block configuration example of the pipeline buffer 32a forming the pipeline circuit 30 shown in FIG. 9. Note that, although FIG. 10 shows an example of the first-stage pipeline buffer 32a of the pipeline circuit 30, the second-stage buffer and the following pipeline buffers 32b, 32c, 32d, and 32e may be formed in the similar block configuration.

As shown in FIG. 10, the pipeline buffer 32a mainly includes at least a data buffer 55, an input controller 56, an output controller 57, and a selector 58.

The data buffer 55 is a first-in first-out (FIFO) buffer that temporarily stores data output to the signal 33 according to the control by the input controller 56. In the third exemplary embodiment, the data buffer 55 is able to temporarily store up to two pieces of data. The data buffer 55 of the pipeline buffer 32a receives clock P0, and stores data at timing of clock P0.

The input controller 56 controls writing of data temporarily stored in the data buffer 55 into the data buffer 55. Further, the input controller 56 performs a flow control regarding data input from the previous circuit through the previous circuit, the data request signal 43, and the data response signal 45.

The data request signal 43 is a signal indicating that the previous circuit has output the data to the signal 33. The input controller 56 refers to the data request signal 43 to recognize that the previous circuit has output the data to the signal 33. On the other hand, the data response signal 45 is a signal indicating that the pipeline buffer 32a is able to receive the data output to the signal 33. When the input controller 56 is able to receive the data output to the signal 33, the input controller 56 outputs the signal indicating it to the data response signal 45.

Further, the input controller 56 outputs an input control signal 51 to the data buffer 55. The input control signal 51 is a signal indicating whether to store the data output from the previous circuit to the signal 33 in the data buffer 55. Further, the input controller 56 outputs a wiring position signal 52 to the data buffer 55 and the output controller 57. The writing position signal 52 is a signal indicating the position in the data buffer 55 which is a data writing destination when the data output to the signal 33 is received in the data buffer 55.

Further, the input controller 56 receives a reading position signal 53 from the output controller 57. The reading position signal 53 is a signal indicating the position in the data buffer 55 which is a reading source when reading the data from the data buffer 55 when the data stored in the data buffer 55 is output to the signal 38a.

The input controller 56 determines whether there is a space in the data buffer 55 to store the data from the value of the writing position signal 52 output from the input controller 56 and the value of the reading position signal 53 received by the input controller 56. When there is a space, the input controller 56 outputs to the data response signal 45 the value "1" indicating that the data can be input. On the other hand, when there is no space, the input controller 56 outputs to the data response signal 45 the value "0" indicating that the data cannot be input.

The input controller 56 receives clock P0, and at timing of clock P0, receives the data request signal 43 and the reading position signal 53, and outputs the data response signal 45, the input control signal 51, and the writing position signal 52.

On the other hand, the output controller 57 controls reading of the data temporarily stored in the data buffer 55 from the data buffer 55, and output of the data to the signal 38a. Further, the output controller 57 performs a flow control regarding output of the data to the pipeline buffer 32b through the subsequent pipeline buffer 32b, the data request signal 41a, and the data response signal 42a.

The data request signal 41a is a signal indicating that the pipeline buffer 32a has output the data to the signal 38a. When the output controller 57 reads out the data temporarily stored in the data buffer 55 and outputs the data to the signal 38a, the output controller 57 notifies the data request signal 41a of it. On the other hand, the data response signal 42a is a signal indicating that the subsequent pipeline buffer 32b is able to receive the data output to the signal 38a. The output controller 57 refers to the data response signal 42a to recognize that the subsequent pipeline buffer 32b is able to receive the data output to the signal 38a.

Further, the output controller 57 outputs the reading position signal 53 to the selector 58 and the input controller 56. When the data is stored in the data buffer 55, the output controller 57 outputs the value to the reading position signal 53 to control the selector 58 to read out the data that is stored at the earliest timing.

Further, the output controller 57 receives the writing position signal 52 from the input controller 56. The output controller 57 determines whether the data is stored in the data buffer 55 from the value of the reading position signal 53 that is output from the output controller 57 and the value of the writing position signal that is received by the output controller 57. When the data is stored, the selector 58 is controlled by the reading position signal 53, selects the data that is stored at the earliest timing, and outputs the data to the signal 38a. Further, the output controller 57 outputs, to the data request signal 41a, the value "1" indicating that the data is output. On the other hand, when the data is not stored, the output controller 57 outputs, to the data request signal 41a, the value "0" indicating that the data is not output.

The output controller 57 receives clock P1, and at the timing of clock P1, receives the data response signal 42a and outputs the reading position signal 53. On the other hand, in the output controller 57, the parts regarding an input of the writing position signal 52 and an output of the data request signal 41a are formed of a combination circuit. Accordingly, the output controller 57 receives the writing position signal 52 and outputs the data request signal 41a as needed regardless of the timing of clock P1.

The selector 58 refers to the reading position signal 53, selects one of up to two pieces of data stored in the data buffer 55, and outputs the selected data to the signal 38a.

Described above is the detailed configuration of the pipeline buffer 32a. Other pipeline buffers 32b to 32e according to the third exemplary embodiment have the similar configuration as described above except that input clock signals are different. For example, the data buffer 55 and the input controller 56 of the pipeline buffer 32b receive clock P1, and the output controller 57 receives clock P2.

Similarly, the data buffer 55 and the input controller 56 of the pipeline buffer 32c receive clock P2, and the output controller 57 receives clock P3. Similarly, the data buffer 55 and the input controller 56 of the pipeline buffer 32d receive clock P3, and the output controller 57 receives clock P4. Similarly, the data buffer 55 and the input controller 56 of the pipeline buffer 32e receive clock P4, and the output controller 57 receives clock P5.

Operation in Third Exemplary Embodiment

Figure 11:
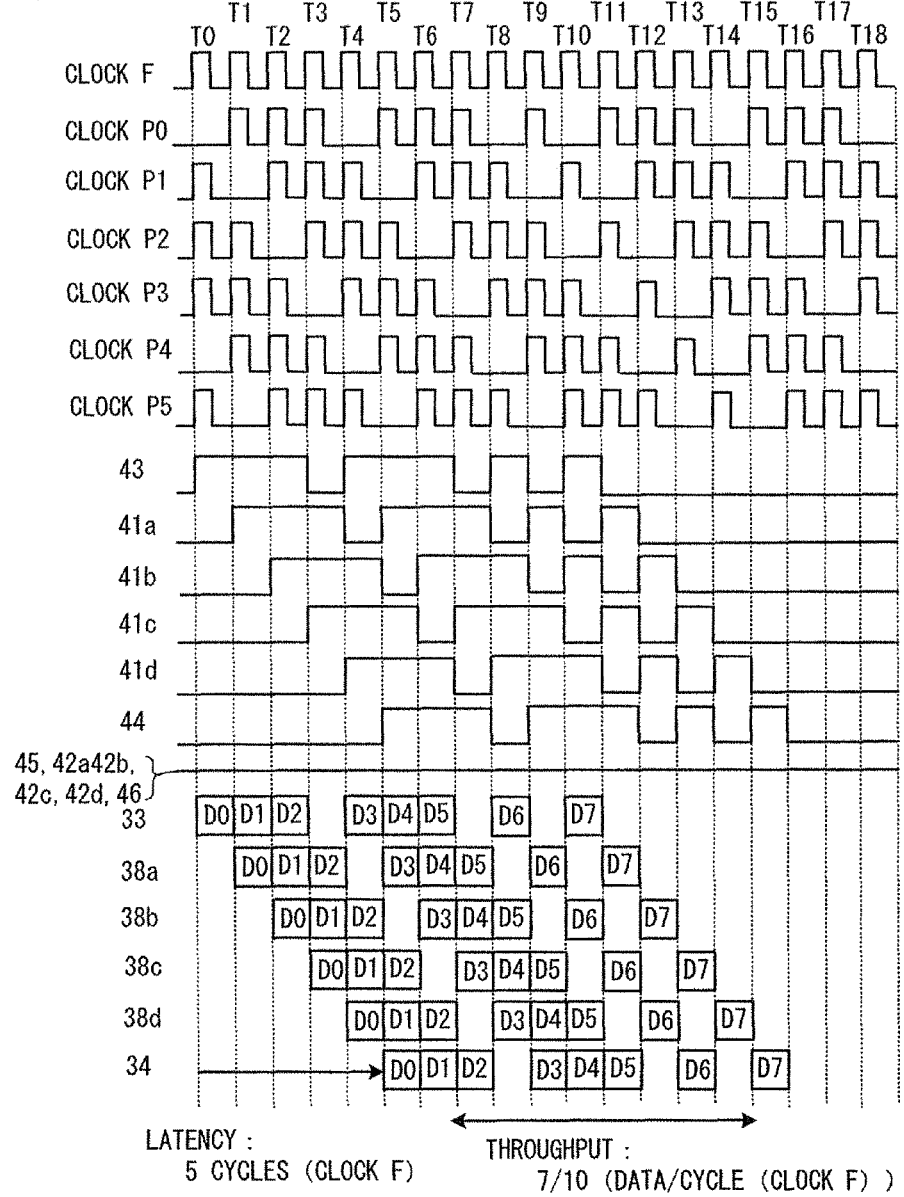
FIG. 11 is a time chart describing one example of a timing relation of data processing by the pipeline circuit shown in FIG. 9.
Figure 12:
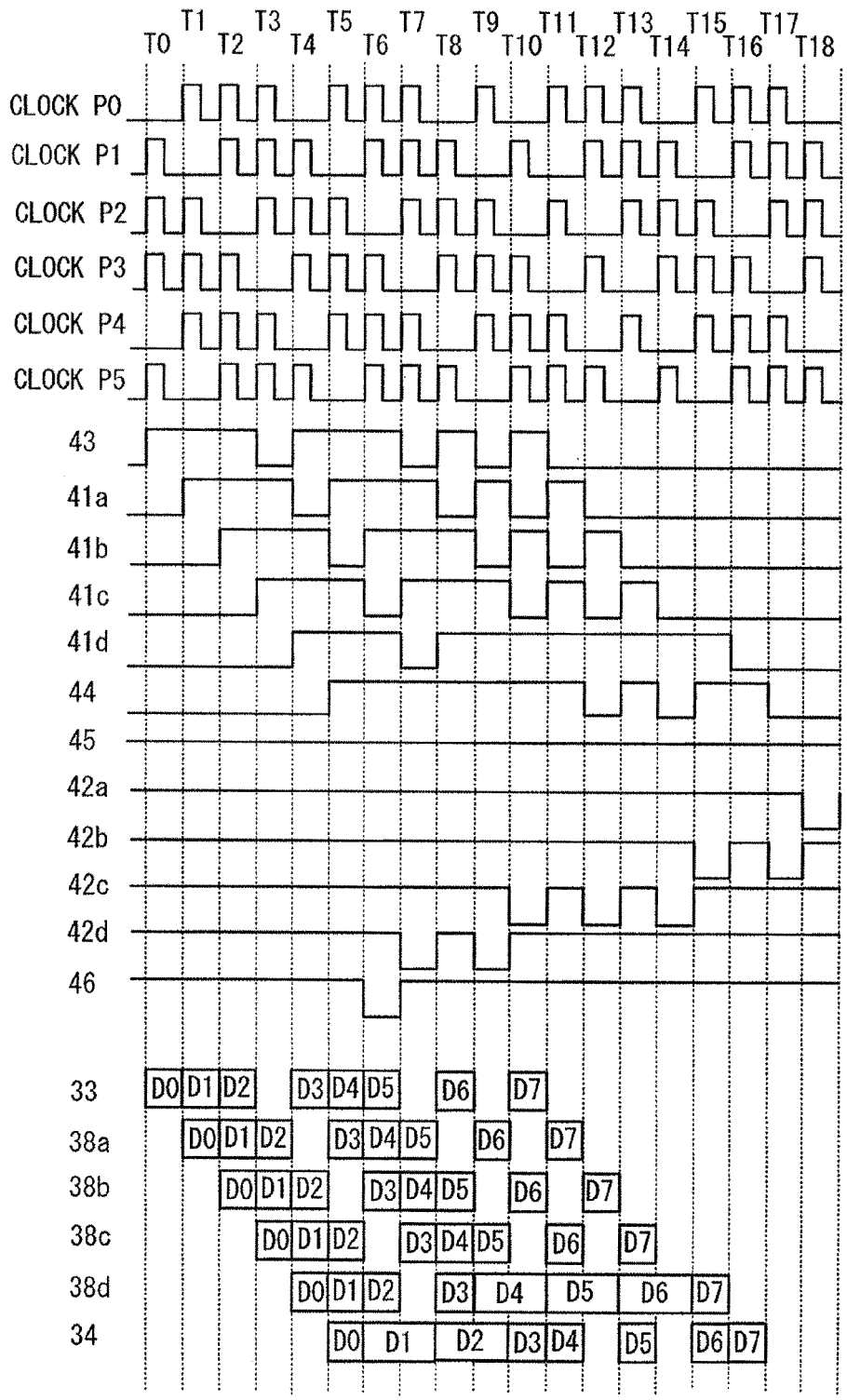
FIG. 12 is a time chart describing another example of the timing relation of data processing by the pipeline circuit shown in FIG. 9.
Figure 13:
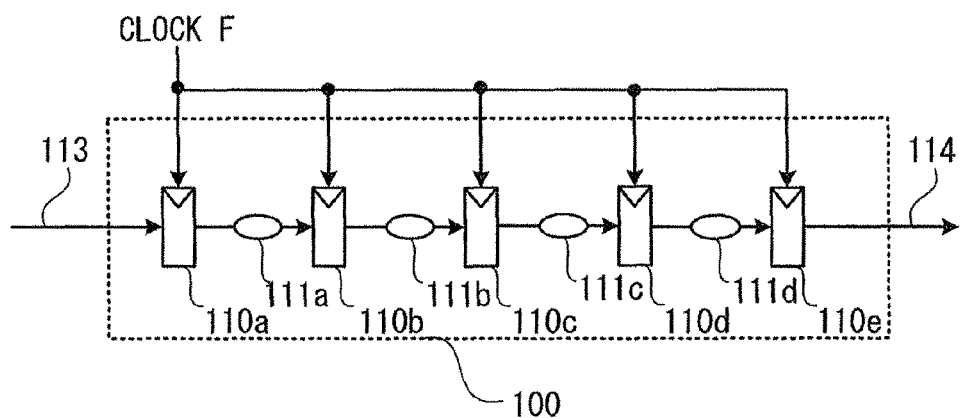
FIG. 13 is a block configuration diagram showing a block configuration of a pipeline circuit according to a related art.
Figure 14:
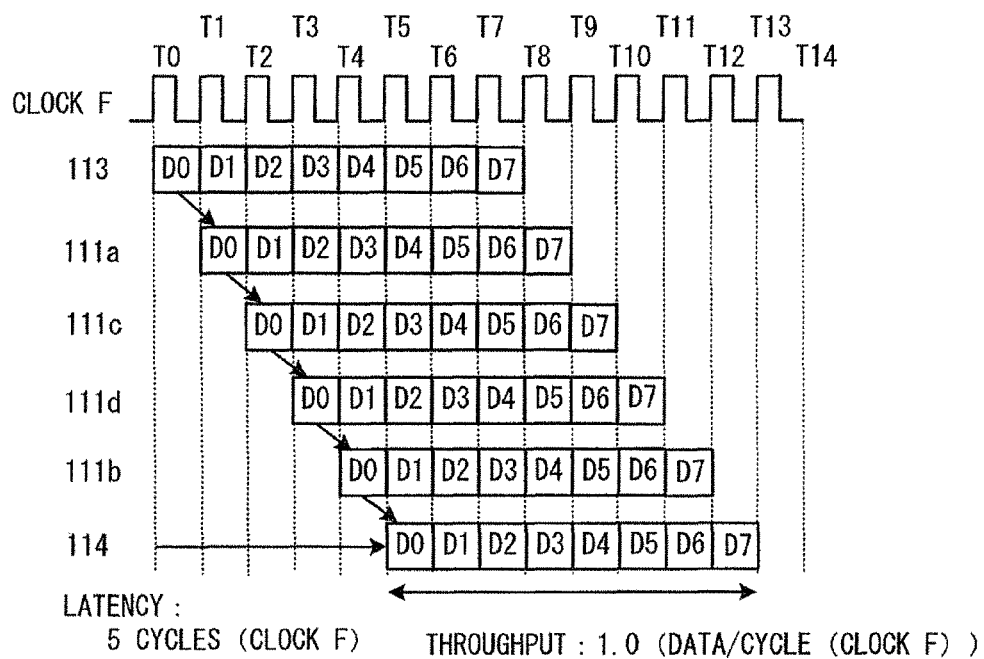
FIG. 14 is a time chart describing a timing relation of data processing by the pipeline circuit shown in FIG. 13.
Figure 15:
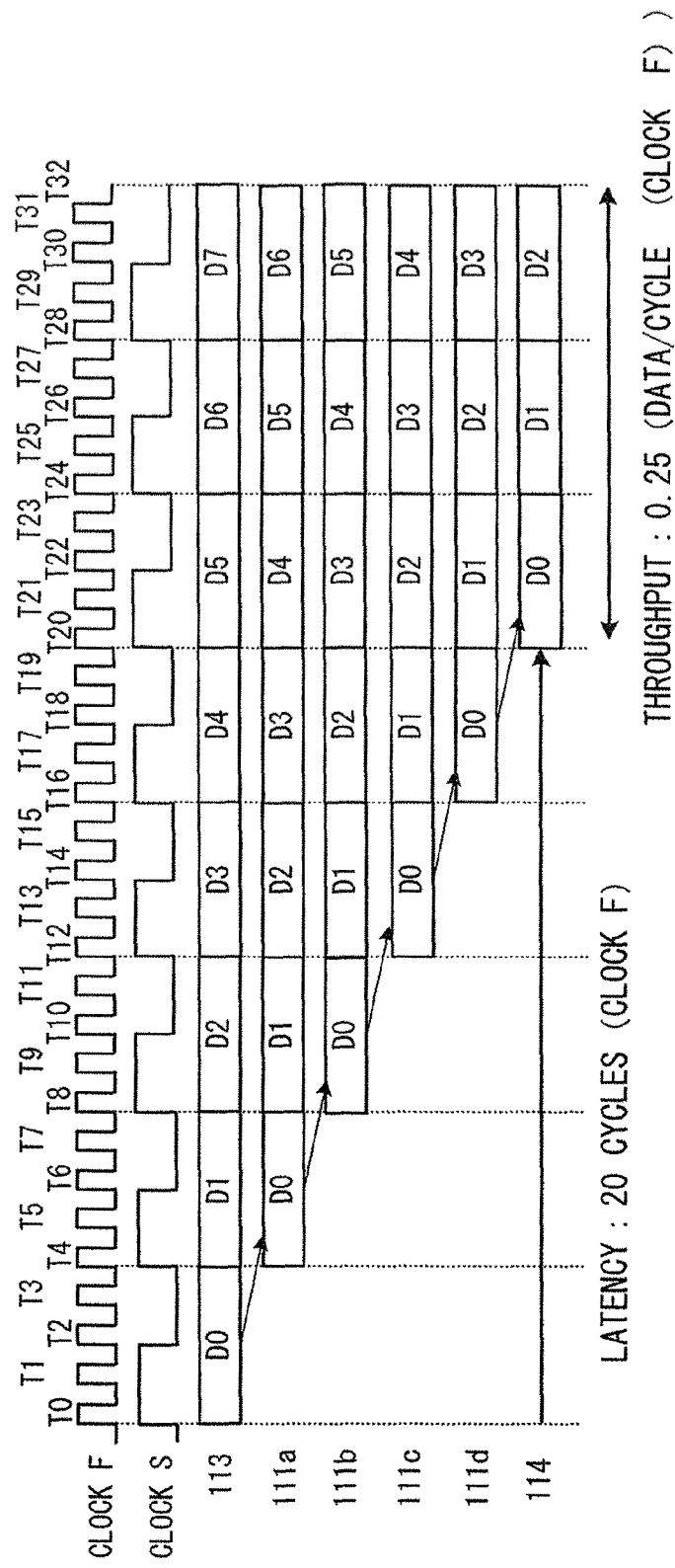
FIG. 15 is a time chart describing the timing relation when a circuit is operated by a clock obtained by reducing a frequency of the clock of the pipeline circuit in FIG. 13 by (¼).

Next, referring to FIGS. 11 and 12, an operational example of the pipeline circuit 30 according to the third exemplary embodiment in FIG. 9 will be described. FIG. 11 is a time chart describing one example of the timing relation of the data processing by the pipeline circuit 30 in FIG. 9 when the frequency of clock F is divided by a frequency dividing ratio (M/N)=(7/10) to generate clocks P0 to P5, and shows a case in which there is no occurrence of a stop (pipeline stall) of a pipeline operation by a flow control. Further, FIG. 12 is a time chart describing another example of the timing relation of the data processing by the pipeline circuit 30 in FIG. 9 when the frequency of clock F is divided by a frequency dividing ratio (M/N)=(7/10) to generate clocks P0 to P5, and shows a case in which there is caused a stop (pipeline stall) of a pipeline operation by a flow control.

(Operation when there is No Occurrence of Pipeline Stop)

First, with reference to a time chart shown in FIG. 11, a case in which there is no occurrence of a stop (pipeline stall) of a pipeline operation by a flow control in the pipeline circuit 30 will be described by taking an example a case in which the frequency of clock F is divided by a frequency dividing ratio (M/N)=(7/10) to generate clocks P0 to P5.

First, processing of the data D0 will be described. In the time chart shown in FIG. 11, a previous circuit (not shown) outputs, at timing T0, the data D0 to the signal 33, and outputs, to the data request signal 43, the value "1" indicating that the data is output. Next, at timing T1 which is one of rising timing of clock P0, the pipeline buffer 32a of the pipeline circuit 30 receives the value "1" from the data request signal 43 to recognize that the data is output to the signal 33. At timing T1, it is assumed that the pipeline buffer 32a can receive data. Accordingly, the pipeline buffer 32a receives the data D0 at timing T1 which is one of the rising timing of clock P0, and stores the data D0 in the data buffer 55 of the pipeline buffer 32a.

At this time, the pipeline buffer 32a outputs the value "1" to the data response signal 45 in order to notify the previous circuit that the pipeline buffer 32a is able to receive data. The previous circuit receives the value "1" from the data response signal 45, and recognizes that the data D0 output to the pipeline buffer 32a is input to the pipeline buffer 32a and the next data D1 can be output.

Further, in the pipeline buffer 32a at timing T1, the value to control the selector 58 is output to the reading position signal 53 to output the data that is stored at the earliest timing in the data buffer 55 to the signal 38a. Accordingly, the pipeline buffer 32a immediately outputs the received data D0 to the partial circuit 31a, and outputs, to the data request signal 41a, the value "1" indicating that the pipeline buffer 32a has output the data through the partial circuit 31a to the signal 38a. The partial circuit 31a performs the processing of the data D0.

Next, at timing T2 which is one of the rising timing of clock P1, the pipeline buffer 32b receives the value "1" from the data request signal 41a, to recognize that the data is output to the signal 38a. Now, it is assumed, at timing T2, that the pipeline buffer 32b can receive the data. Accordingly, at timing T2 which is one of timing of clock P1, the pipeline buffer 32b receives the data D0 processed by the partial circuit 21a and stores the data D0 in the data buffer 55 of the pipeline buffer 32b.

At this time, the pipeline buffer 32b outputs the value "1" to the data response signal 42a in order to notify the previous pipeline buffer 32a that the pipeline buffer 32b is able to receive data. The pipeline buffer 32a receives the value "1" from the data response signal 42a, and recognizes that the data D0 output to the pipeline buffer 32b is input to the pipeline buffer 32b and the next data D1 can be output.

Further, in the pipeline buffer 32b at timing T2, the value to control the selector 58 is output to the reading position signal 53 to output the data that is stored at the earliest timing in the data buffer 55 to the signal 38b. Accordingly, the pipeline buffer 32b immediately outputs the received data D0 to the partial circuit 31b, and outputs, to the data request signal 41b, the value "1" indicating that the data is output to the signal 38b through the partial circuit 31b. The partial circuit 31b performs the processing of the data D0.

In the following processing, in the similar way, at timing T3 which is one of the rising timing of clock P2, the pipeline buffer 32c stores the data D0 which is processed by the partial circuit 31b in the data buffer 55 of the pipeline buffer 32c, and further immediately outputs the received data D0 to the partial circuit 31c. The partial circuit 31c performs the processing of the data D0. Next, at timing T4 which is one of rising timing of clock P3, the pipeline buffer 32d stores the data D0 processed by the partial circuit 31c in the data buffer 55 of the pipeline buffer 32d, and further immediately outputs the received data D0 to the partial circuit 31d. The partial circuit 31d performs the processing of the data D0.

Last, at timing T5 which is one of the rising timing of clock P4, the pipeline buffer 32e stores the data D0 processed by the partial circuit 31d in the data buffer 55 of the pipeline buffer 32e, and further immediately outputs the received data D0 to the signal 34.

Next, the processing of the next data D1 will be described. In the time chart shown in FIG. 11, at timing T1, the previous circuit (not shown) receives the value "1" from the data response signal 45, and recognizes that the data D0 is input to the pipeline buffer 32a and the next data D1 can be output. Accordingly, at timing T1, the previous circuit (not shown) outputs the next data D1 to the signal 33 and outputs, to the data request signal 43, the value "1" indicating that the data is output. Next, at timing T2 which is one of the rising timing of clock P0, the pipeline buffer 32a of the pipeline circuit 30 receives the value "1" from the data request signal 43, and recognizes that the next data is output to the signal 33. Now, at timing T2, it is assumed that the pipeline buffer 32a is able to receive data. Accordingly, the pipeline buffer 32a receives the data D1 at timing T2 which is one of the rising timing of clock P0 and stores the data D1 in the data buffer 55 of the pipeline buffer 32a.

At this time, the pipeline buffer 32a outputs the value "1" to the data response signal 45 in order to notify the previous circuit that the pipeline buffer 32a is able to receive data. The previous circuit receives the value "1" from the data response signal 45, and recognizes that the data D1 output to the pipeline buffer 32a is input to the pipeline buffer 32a and the next data D2 can be output.

Further, in the pipeline buffer 32a at timing T2, the value to control the selector 58 is output to the reading position signal 53 to output the data that is stored at the earliest timing in the data buffer 55 to the signal 38a. Accordingly, the pipeline buffer 32a immediately outputs the received data D1 to the partial circuit 31a, and outputs, to the data request signal 41a, the value "1" indicating that the data is output to the signal 38a through the partial circuit 31a. The partial circuit 31a performs the processing of the data D1.

Next, at timing T3 which is one of the rising timing of clock the pipeline buffer 32b receives the value "1" from the data request signal 41a, and recognizes that the next data is output to the signal 38a. Note that, it is assumed, at timing T3, that the pipeline buffer 32b is able to receive the data. Accordingly, at timing T3 which is one of the timing of clock P1, the pipeline buffer 32b receives the data D1 processed by the partial circuit 21a and stores the data D1 in the data buffer 55 of the pipeline buffer 32b.

At this time, the pipeline buffer 32b outputs the value "1" to the data response signal 42a in order to notify the previous pipeline buffer 32a that the pipeline buffer 32b is able to receive data. The pipeline buffer 32a receives the value "1" from the data response signal 42a, and recognizes that the data D1 output to the pipeline buffer 32b is input to the pipeline buffer 32b, and the next data D2 can be output.

Further, in the pipeline buffer 32b at timing T3, the value to control the selector 58 is output to the reading position signal 53 to output the data that is stored at the earliest timing in the data buffer 55 to the signal 38b. Accordingly, the pipeline buffer 32b immediately outputs the received data D1 to the partial circuit 31b, and outputs, to the data request signal 41b, the value "1" indicating that the data is output to the signal 38b through the partial circuit 31b. The partial circuit 31b performs the processing of the data D1.

In the following processing, in the similar way, at timing T4 which is one of the rising timing of clock P2, the pipeline buffer 32c stores the data D1 processed by the partial circuit 31b in the data buffer 55 of the pipeline buffer 32c, and further immediately outputs the received data D1 to the partial circuit 31c. The partial circuit 31c performs the processing of the data D1. Next, at timing T5 which is one of the rising timing of clock P3, the pipeline buffer 32d stores the data D1 processed by the partial circuit 31c in the data buffer 55 of the pipeline buffer 32d, and further immediately outputs the received data D1 to the partial circuit 31d. The partial circuit 31d performs the processing of the data D1.

Last, at timing T6 which is one of the rising timing of clock P4, the pipeline buffer 32e stores the data D1 which is processed by the partial circuit 31d in the data buffer 55 of the pipeline buffer 32e, and further immediately outputs the received data D1 to the signal 34.

In the following processing, in the similar way, the data D2 to D7 output by the previous circuit (not shown) to the signal 33 at each of timings T2, T4, T5, T6, T8, and T10 are processed by the pipeline circuit 30, and these data are output to the signal 34 at each of timings T7, T9, T10, T11, 113, and T15.

(Operation when Pipeline Stops)

Next, with reference to a time chart shown in FIG. 12, a case will be described in which there is caused a stop (pipeline stall) of the pipeline operation by a flow control in the pipeline circuit 30 by taking as an example a case in which the frequency of clock F is divided by a frequency dividing ratio (M/N)=(7/10) to generate clocks P0 to P5. FIG. 12 shows a timing relation of the data processing by the pipeline circuit 30 in FIG. 9 in a case in which there is caused a stop (pipeline stall) of the pipeline operation by a flow control as described above.

The difference in the data processing example between the time charts shown in FIG. 11 and FIG. 12 is that, in FIG. 12, at timing 17, the subsequent circuit (not shown) cannot receive the data D1 output to the signal 34. As in the first exemplary embodiment and the second exemplary embodiment, when the pipeline circuit 10 or the pipeline circuit 20 does not include the flow control function, data can be lost when the subsequent circuit or the subsequent pipeline register cannot receive data. This is because, subsequent data are sequentially output from the previous stage of the pipeline circuit, although the subsequent circuit cannot receive data.

Meanwhile, in the pipeline circuit 30 including a flow control function as in the third exemplary embodiment, the pipeline operation is appropriately stopped even when there occurs a situation in which the subsequent circuit cannot receive data, thereby preventing data loss.

In the following description, with reference to the time chart shown in FIG. 12, processing of data D1 will be described in which the subsequent circuit (not shown) cannot receive data at timing T7.

(Operation from Timings T2 to T6)

First, at timing T2 which is one of the rising timing of clock P0, the pipeline buffer 32a of the pipeline circuit 30 receives the data D1 output from the previous circuit (not shown) to the signal 33, stores the data D1 in the data buffer 55 of the pipeline buffer 32a, further immediately outputs the received data D1 to the signal 38a, and outputs the data D1 to the partial circuit 31a. The partial circuit 31a performs the processing of the data D1.

Next, at timing T3 which is one of the rising timing of clock P1, the pipeline buffer 32b stores the data D1 processed by the partial circuit 31a in the data buffer 55 of the pipeline buffer 32b, further outputs the data D1 to the signal 38b, and outputs the data to the partial circuit 31b. The partial circuit 31b performs the processing of the data D1.

Next, at timing T4 which is one of the rising timing of clock P2, the pipeline buffer 32c stores the data D1 processed by the partial circuit 31b in the data buffer 55 of the pipeline buffer 32c, further outputs the data D1 to the signal 38c, and outputs the data to the partial circuit 31c. The partial circuit 31c performs the processing of the data D1.

Next, at timing T5 which is one of the rising timing of clock P3, the pipeline buffer 32d stores the data D1 processed by the partial circuit 31c in the data buffer 55 of the pipeline buffer 32d, further outputs the data D1 to the signal 38d, and outputs the data D1 to the partial circuit 31d. The partial circuit 31d performs the processing of the data D1.

Next, at timing T6 which is one of the rising timing of clock P4, the pipeline buffer 32e stores the data D1 processed by the partial circuit 31d in the data buffer 55 of the pipeline buffer 32e, and further outputs the data D1 to the signal 34.

Now, at timing T6 which is one of the rising timing of clock P3, the pipeline buffer 32d which is arranged at the previous stage of the pipeline buffer 32e outputs the next data D2 to the signal 38d, and outputs the data D2 to the partial circuit 31d. The partial circuit 31d performs the processing of the data D2.

(Operation at Timing T7)

However, it is assumed that the subsequent circuit (not shown) cannot receive, at timing T7, the data D1 output to the signal 34 from the pipeline buffer 32e at timing T6, as described above. At this time, the subsequent circuit (not shown) outputs the value "0" to the data response signal 46 to notify the pipeline buffer 32e that the subsequent circuit cannot receive data.

Accordingly, at timing T7 which is one of the rising timing of clock P5, the pipeline buffer 32e receives the value "0" from the data response signal 46 to recognize that the subsequent circuit could not receive the data D1. As a result, the pipeline buffer 32e continuously performs a control to output the data D1 to the signal 34 without changing the value of the reading position signal 53. Further, at timing T7, the pipeline buffer 32e continuously stores the data D1 in the data buffer 55 of the pipeline buffer 32e. In addition, the pipeline buffer 32e receives the next data D2 output to the signal 38d from the previous pipeline buffer 32d, and stores the data D2 in the data buffer 55 of the pipeline buffer 32e.

Now, the data buffer 55 in each of the pipeline buffers 32a to 32e is able to store up to two pieces of data. Accordingly, it is possible to concurrently store the data D1 and the next data D2 in the pipeline buffer 32e. However, the data buffer 55 of the pipeline buffer 32e cannot store more than two pieces of data. In such a case, the pipeline buffer 32e outputs the value "0" to the data response signal 42d, and notifies the previous pipeline buffer 32d of it.

(Operation at Timing T8)

Now, it is assumed, at timing T8, that the subsequent circuit (not shown) is able to receive the data D1. In such a case, the subsequent circuit receives the data D1 output from the pipeline buffer 32e to the signal 34, and outputs the value "1" to the data response signal 46, thereby notifying the pipeline buffer 32e that the subsequent circuit has received the data D1 and is able to receive the next data D2. Accordingly, the pipeline buffer 32e receives the value "1" from the data response signal 46, and recognizes that the subsequent circuit has received the data D1 and is able to receive output the next data D2. As a result, at timing T8 which is one of the rising timing of clock P5, the pipeline buffer 32e changes the value of the reading position signal 53, and outputs the next data D2 stored in the data buffer 55 of the pipeline buffer 32e to the signal 34.

Further, since the output of the data D1 is completed, there is now one space available in the data buffer 55 of the pipeline buffer 32e. Then, the pipeline buffer 32e outputs the value "1" to the data response signal 42d, to notify the previous pipeline buffer 32d that the pipeline buffer 32e is able to receive data.

Further, at timing T8 which is also one of the rising timing of clock P3, the pipeline buffer 32d which is arranged at a previous stage of the pipeline buffer 32e outputs the next data D3 to the signal 38d, and outputs the data D3 to the partial circuit 31d. The partial circuit 31d performs the processing of the data D3.

(Operation at Timing T9)

It is assumed, at timing T9, that the subsequent circuit (not shown) is able to receive the data D2. In such a case, the subsequent circuit receives the data D2 output from the pipeline buffer 32e to the signal 34, and outputs the value "1" to the data response signal 46, thereby notifying the pipeline buffer 32e that the subsequent circuit has received the data D2. Accordingly, the pipeline buffer 32e receives the value "1" from the data response signal 46, and recognizes that the subsequent circuit has received the data D2 and is able to output the next data D3.

However, timing T9 is not the rising timing of clock P5. Thus, the pipeline buffer 32e continuously outputs the data D2 to the signal 34 without changing the value of the reading position signal 53.

On the other hand, timing T9 is one of the rising timing of clock P4. Thus, the pipeline buffer 32e stores the data D2 continuously in the data buffer 55 of the pipeline buffer 32e. In addition, the pipeline buffer 32e receives the next data D3 output to the signal 38d and stores the data in the data buffer 55 of the pipeline buffer 32e. However, since the data buffer 55 of the pipeline buffer 32e cannot receive more than two pieces of data, the pipeline buffer 32e outputs the value "0" to the data response signal 42d, to notify the previous pipeline buffer 32d of it.

(Operation at Timing T10)

Next, at timing T10 which is one of the rising timing of clock P5, the pipeline buffer 32e receives the value "1" from the data response signal 46, and recognizes that the subsequent circuit has received the data D2 and is able to receive output the next data D3. As a result, the pipeline buffer 32e changes the value of the reading position signal 53, to output the next data D3 to the signal 34. On the other hand, the subsequent circuit receives the data D3 output from the pipeline buffer 32e to the signal 34, and outputs the value "1" to the data response signal 46, thereby notifying the pipeline buffer 32e that the subsequent circuit has received the data D3 and is able to receive the next data D4.

(Operations at Timing T11 and the Following Processing)

In the following processing, in the similar way, at each of timings T11, T13, T15, T16, the pipeline buffer 32e receives the value "1" from the data response signal 46. Accordingly, each of data D4 to D7 processed by the pipeline circuit 30 is output from the pipeline buffer 32e to the signal 34. The subsequent circuit sequentially receives these data D4 to D7.

Described above is a case in which six clock signals (clocks P0 to P5) are used having phases delayed by Tcyc in the order of clocks P0 to P5. However, the third exemplary embodiment may be applied to other cases as well in which any desired number of clock signals are used. More specifically, among any desired number of clock signals, two clock signals whose phases are delayed by a predetermined phase are sequentially allocated from the previous pipeline buffer to the subsequent pipeline buffer of the pipeline circuit 30. At this time, the clock signals may be allocated so that adjacent pipeline buffers share one clock signal having the same phase.

Advantageous Effect of Third Exemplary Embodiment

As described above, in the pipeline circuit 30 according to the third exemplary embodiment, even when each pipeline buffer forming a pipeline circuit or a subsequent circuit cannot receive data when the clock frequency is reduced by dividing the frequency by a multiple of a rational number specified by (M/N)-fold (M is a positive integer, and N is a positive integer larger than M), the data can be normally processed by performing a flow control using the data response signals 42a to 42d, and 46.

The reason for it is that the pipeline circuit 30 according to the third exemplary embodiment allocates successive two clocks among clocks P0 to P5 whose phases are delayed by a predetermined phase in series from the previous pipeline buffer to the subsequent pipeline buffer, and at the same time, the pipeline circuit 30 allocates the clocks so that one clock signal having an identical phase is shared between adjacent pipeline buffers. As a result, the flow control function normally operates even when the clock frequency is lowered due to the frequency division by a multiple of a rational number. Accordingly, the flow control function performs a control to stop the pipeline operation as required, thereby preventing data loss.

On the other hand, such a problem arises in a configuration in which a single clock signal is allocated to each of the pipeline buffers forming the pipeline circuit as in the first exemplary embodiment and the second exemplary embodiment that, even when the flow control function is added, the flow control function does not normally operate when the clock frequency is lowered by dividing the frequency by a multiple of a rational number. This problem is due to the fact that, when there is a signal opposite to the direction in which data to be processed is transferred as in the data response signals 42a to 42d in the pipeline circuit, in a case in which the phase of a clock signal allocated to a pipeline buffer that outputs one data response signal is different from the phase of a clock signal allocated to the previous pipeline buffer that receives the data response signal, the previous pipeline buffer may not be able to receive the data response signal output from the subsequent pipeline buffer.

This cause will be described further in detail with some examples. It is assumed that all the operations in the pipeline buffer 32c in the pipeline circuit 30 in FIG. 9 are performed at timing of clock P2. At this time, the pipeline buffer 32c receives the data response signal 42c output from the subsequent pipeline buffer 32d at the rising timing of clock P2.

In FIG. 11, for example, the pipeline buffer 32d outputs the data response signal 42c at timing T5 or timing T6 which is the rising timing of clock P3. On the other hand, it is timing T7 which is the next rising timing of clock P2 that the previous pipeline buffer 32c receives the data response signal 42c output from the pipeline buffer 32d at timing T5. Similarly, it is also timing T7 that the previous pipeline buffer 32c receives the data response signal 42c output from the pipeline buffer 32d at timing T6.

In summary, the next data response signal 42c is output from the subsequent pipeline buffer 32d at timing T6 before the previous pipeline buffer 32c receives, at timing T7, the data response signal 42c output from the subsequent pipeline buffer 32d at timing T5. Thus, the previous pipeline buffer 32c cannot receive the data response signal 42c output from the subsequent pipeline buffer 32d at timing T5.

On the other hand, the pipeline circuit 30 according to the third exemplary embodiment allocates two successive clock signals among clocks P0 to P5 whose phases are delayed by a predetermined phase from the previous pipeline buffer to the subsequent pipeline buffer. At the same time, the pipeline circuit 30 allocates the signals so that one clock signal having an identical phase is shared by adjacent pipeline buffers. Accordingly, the input controller 56 of the subsequent pipeline buffer that outputs the data response signal and the output controller 57 of the previous pipeline buffer that receives the data response signal operate by the same clock signal. Accordingly, there is no occurrence of the case in which the previous pipeline buffer cannot receive the data response signal output from the subsequent pipeline buffer. Thus, even when the clock frequency is reduced by frequency division by a rational number, the flow control function according to the third exemplary embodiment normally operates.

Further, in the example shown in FIG. 11 where there is no occurrence of a stop of the pipeline operation by a flow control, it takes time corresponding to five cycles of clock F from when the data output from the previous circuit is processed by the pipeline circuit 30 to when the data is output to the signal 34 (e.g., the data D0 is input to the pipeline circuit 30 through the signal 33 at timing T0, and is output from the pipeline circuit 30 to the signal 34 at timing T5). In short, the latency of the data processing of the pipeline circuit 30 is five cycles of clock F.

On the other hand, the pipeline circuit 30 includes four-stage pipeline circuits of the partial circuits 31a, 31b, 31c, and 31d, and the data processing is achieved by the pipeline operation. Accordingly, even though the latency is five cycles, the data processing can be performed for each cycle of clocks P0 to P5. In summary, since the data processing can be performed for each of seven cycles of ten cycles of clock F, the throughput of the data processing of the pipeline circuit 30 is (7/10) data/cycle (indicating that the data of (7/10) is processed for one cycle of clock F).

In summary, according to the third exemplary embodiment, when there is no occurrence of a stop of the pipeline operation by the flow control, if the clock frequency is made (7/10)-fold, the throughput becomes (7/10)-fold, whereas the latency is kept one-fold, and does not increase as in the related art.

Further, in the example shown in FIG. 12 in which there occurs a stop of the pipeline operation by the flow control, it takes time corresponding to up to six cycles of clock F from when the data output from the previous circuit is processed by the pipeline circuit 30 to when the data is output to the signal 34 (e.g., the data D2 is input to the pipeline circuit 30 through the signal 33 at timing T2, and is output from the pipeline circuit 30 to the signal 34 at timing T8). In short, the latency of the data processing of the pipeline circuit 30 is six cycles of clock F. This is because the pipeline circuit 30 has stopped by one cycle of clock F.

On the other hand, the throughput reduces by the amount corresponding to the stop of the pipeline circuit 30 by one cycle of clock F. Specifically, since the data processing is performed in seven cycles among 11 cycles of clock F including one cycle that is stopped, the throughput of the data processing of the pipeline circuit 30 is (7/11) data/cycle (indicating that data of (7/11) is processed for each cycle of clock F).

More typically, according to the third exemplary embodiment, when the pipeline operation does not stop by the flow control, the throughput becomes (M/N)-fold when the frequency is made (M/N)-fold (M is a positive integer, and N is a positive integer larger than M). Meanwhile, the latency becomes one-fold or does not increase. Further, when the pipeline operation stops for S cycles (S is a positive integer) by the flow control, the throughput becomes {M/(N+S)}-fold when the frequency is made (M/N)-fold (M is a positive integer, and N is a positive integer larger than M). Meanwhile, the latency only increases by S cycles.

Accordingly, when the throughput is sufficient for a required performance, the clock frequency can be flexibly reduced by any multiple of a rational number specified by (M/N)-fold without increasing the processing latency, thereby making it possible to reduce power consumption in the pipeline circuit 30. Further, even when the clock frequency is reduced, the processing latency does not increase or only increases by the amount corresponding to the stop of the pipeline. Thus, the throughput of the whole processing does not reduce even when the processing result of the pipeline circuit 30 is used in the subsequent processing.

The configuration of the preferred exemplary embodiments according to the present invention has been described above. However, these exemplary embodiments are merely examples of the present invention, and not intended to limit the present invention. A person skilled in the art would easily understand that various modifications or changes can be made according to the specific applications without departing from the spirit of the present invention. For example, the exemplary embodiments of the present invention can be expressed as the following structures in addition to the structures (1) and (6) stated in Solution to Problem. The following numbers (2)-(5) and (7)-(8) correspond to the numbers in Claims.

(2) The pipeline circuit according to (1), in which each of the P number of clock signals is a clock signal generated by dividing a frequency of a high-speed clock signal by (M/N) by masking (N−M) number of clock pulses among N successive number of clock pulses of the high-speed clock signal based on a frequency dividing ratio specified by (M/N)-fold (M is a positive integer, and N is a positive integer larger than M), and the P number of clock signals have phases delayed each other by time equivalent to a cycle time of the high-speed clock signal in the order of the first clock signal to the P-th clock signal.

(3) The pipeline circuit according to (1) or (2), in which, for a signal output from a subsequent pipeline buffer and received by a previous pipeline buffer of the two adjacent pipeline buffers, a circuit that outputs the signal included in the subsequent pipeline buffer and a circuit that receives the signal included in the previous pipeline buffer are operated by the same clock signal.

(4) A semiconductor device including a pipeline circuit mounted thereon, the semiconductor device including the pipeline circuit according to any one of (1) to (3) mounted thereon as the pipeline circuit.

(5) The semiconductor device according to (4), in which the semiconductor device is a communication server apparatus that processes a number of events in real time.

(7) The pipeline control method according to (6), in which each of the P number of clock signals is a clock signal generated by dividing a frequency of a high-speed clock signal by (M/N) by masking (N−M) number of clock pulses among N successive number of clock pulses of the high-speed clock signal based on a frequency dividing ratio specified by (M/N)-fold (M is a positive integer, and N is a positive integer larger than M), and the P number of clock signals have phases delayed each other by time equivalent to a cycle time of the high-speed clock signal in the order of the first clock signal to the P-th clock signal.

(8) The pipeline control method according to (6) or (7), in which, for a signal output from a subsequent pipeline buffer and received by a previous pipeline buffer of the two adjacent pipeline buffers, a circuit that outputs the signal included in the subsequent pipeline buffer and a circuit that receives the signal included in the previous pipeline buffer are operated by the same clock signal.

Although the present invention has been described as a hardware configuration according to the exemplary embodiments stated above, the present invention is not limited to it. The present invention may achieve any desired processing by causing a central processing unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been described with reference to the exemplary embodiments, the present invention is not limited to the above description. Various changes that can be understood by a person skilled in the art may be made to the configuration or the details of the present invention within the scope of the present invention.

This application claims the benefit of priority, and incorporates herein by reference in its entirety, the following Japanese Patent Application No. 2009-161813 filed on Jul. 8, 2009.

INDUSTRIAL APPLICABILITY

The present invention relates to a pipeline circuit, a semiconductor device, and a pipeline control method, and is applicable to a controller and a control method of a semiconductor device including a pipeline circuit mounted thereon.

REFERENCE SIGNS LIST

10 PIPELINE CIRCUIT
11A, 11B, 11C, 11D PARTIAL CIRCUIT 12A, 12B, 12C, 12D, 12E PIPELINE REGISTER
13, 14 SIGNAL
20 PIPELINE CIRCUIT
21A, 21B, 21C, 21D PARTIAL CIRCUIT
22A, 22B, 22C, 22D, 22E PIPELINE REGISTER
23, 24 SIGNAL
25 MASK CONTROLLER
26A, 26B, 26C, 26D, 26E, 26F MASK SIGNAL
27A, 27B, 27C, 27D, 27E, 27F MASK CIRCUIT
28 CLOCK SIGNAL FREQUENCY DIVIDER
30 PIPELINE CIRCUIT
31A, 31B, 31C, 31D PARTIAL CIRCUIT
32A, 32B, 32C, 32D, 32E PIPELINE BUFFER
33, 34 SIGNAL
38A, 38B, 38C, 38D SIGNAL
41A, 41B, 41C, 41D DATA REQUEST SIGNAL
42A, 42B, 42C, 42D DATA RESPONSE SIGNAL
43, 44 DATA REQUEST SIGNAL
45, 46 DATA RESPONSE SIGNAL
51 INPUT CONTROL SIGNAL
52 WRITING POSITION SIGNAL
53 READING POSITION SIGNAL
55 DATA BUFFER
56 INPUT CONTROLLER
57 OUTPUT CONTROLLER
58 SELECTOR
61 COUNTER
62 TABLE CIRCUIT
63 COUNT VALUE
64 TABLE DATA
65 SHIFT REGISTER
69 MASK TIMING SIGNAL
100 PIPELINE CIRCUIT
110A, 110B, 110C, 110D, 110E PIPELINE REGISTER
111A, 111B, 111C, 111D PARTIAL CIRCUIT
113 SIGNAL
114 SIGNAL
F CLOCK

The invention claimed is:

1. A pipeline circuit comprising a plurality of stages of pipeline buffers, in which among P (P is a positive integer) clock signals from a first clock signal to a P-th clock signal, two successive clock signals whose phases are delayed each other by a predetermined phase are sequentially allocated to each of pipeline buffers from a pipeline buffer located at a previous stage of the pipeline circuit to a pipeline buffer located at a subsequent stage of the pipeline circuit, the clock signals being allocated so that two adjacent pipeline buffers share one clock signal having an identical phase among the two clock signals allocated to the two adjacent pipeline buffers, each of the pipeline buffers being operated by the two clock signals allocated to each of them, the P number of clock signals having phases delayed in the order from the first clock signal to the P-th clock signal.

2. The pipeline circuit according to claim 1, wherein each of the P number of clock signals comprises a clock signal generated by dividing a frequency of a high-speed clock signal by (M/N) by masking (N−M) number of clock pulses among N successive number of clock pulses of the high-speed clock signal based on a frequency dividing ratio specified by (M/N)-fold (M is a positive integer, and N is a positive integer larger than M), and the P number of clock signals have phases delayed each other by time equivalent to a cycle time of the high-speed clock signal in the order of the first clock signal to the P-th clock signal.

3. The pipeline circuit according to claim 1, wherein, for a signal output from a subsequent pipeline buffer and received by a previous pipeline buffer of the two adjacent pipeline buffers, a circuit that outputs the signal included in the subsequent pipeline buffer and a circuit that receives the signal included in the previous pipeline buffer are operated by the same clock signal.

4. A semiconductor device including a pipeline circuit mounted thereon, the semiconductor device including the pipeline circuit according to claim 1 mounted thereon as the pipeline circuit.

5. The semiconductor device according to claim 4, wherein the semiconductor device comprises a communication server apparatus that processes a number of events in real time.

6. The pipeline circuit according to claim 2, wherein, for a signal output from a subsequent pipeline buffer and received by a previous pipeline buffer of the two adjacent pipeline buffers, a circuit that outputs the signal included in the subsequent pipeline buffer and a circuit that receives the signal included in the previous pipeline buffer are operated by the same clock signal.

7. A semiconductor device including a pipeline circuit mounted thereon, the semiconductor device including the pipeline circuit according to claim 2 mounted thereon as the pipeline circuit.

8. A semiconductor device including a pipeline circuit mounted thereon, the semiconductor device including the pipeline circuit according to claim 3 mounted thereon as the pipeline circuit.

9. A pipeline control method controlling a pipeline circuit comprising a plurality of stages of pipeline buffers, in which among P (P is a positive integer) clock signals from a first clock signal to a P-th clock signal, two successive clock signals whose phases are delayed each other by a predetermined phase are sequentially allocated to each of pipeline buffers from a pipeline buffer located at a previous stage of the pipeline circuit to a pipeline buffer located at a subsequent stage of the pipeline circuit, the clock signals being allocated so that two adjacent pipeline buffers share one clock signal having an identical phase among the two clock signals allocated to the two adjacent pipeline buffers, each of the pipeline buffers being operated by the two clock signals allocated to each of them, the P number of clock signals having phases delayed in the order from the first clock signal to the P-th clock signal.

10. The pipeline control method according to claim 9, wherein each of the P number of clock signals comprises a clock signal generated by dividing a frequency of a high-speed clock signal by (M/N) by masking (N−M) number of clock pulses among N successive number of clock pulses of the high-speed clock signal based on a frequency dividing ratio specified by (M/N)-fold (M is a positive integer, and N is a positive integer larger than M), and the P number of clock signals have phases delayed each other by time equivalent to a cycle time of the high-speed clock signal in the order of the first clock signal to the P-th clock signal.

11. The pipeline control method according to claim 10, wherein, for a signal output from a subsequent pipeline buffer and received by a previous pipeline buffer of the two adjacent pipeline buffers, a circuit that outputs the signal included in the subsequent pipeline buffer and a circuit that receives the signal included in the previous pipeline buffer are operated by the same clock signal.

12. The pipeline control method according to claim 9, wherein, for a signal output from a subsequent pipeline buffer and received by a previous pipeline buffer of the two adjacent pipeline buffers, a circuit that outputs the signal included in the subsequent pipeline buffer and a circuit that receives the signal included in the previous pipeline buffer are operated by the same clock signal.

\* \* \* \* \*